US011403726B2

(12) United States Patent
Cullen

(10) Patent No.: US 11,403,726 B2
(45) Date of Patent: Aug. 2, 2022

(54) PAID CONTEST AND BET CONTRACT EXCHANGE SYSTEMS AND METHODS

(71) Applicant: The Bet Exchange LLC, Mount Prospect, IL (US)

(72) Inventor: Robert J. Cullen, Mount Prospect, IL (US)

(73) Assignee: THE BET EXCHANGE LLC, Mount Prospect, IL (US)

(*) Notice: Subject to any disclaimer, the term of this patent is extended or adjusted under 35 U.S.C. 154(b) by 0 days.

(21) Appl. No.: 16/803,654

(22) Filed: Feb. 27, 2020

(65) Prior Publication Data

US 2021/0272228 A1  Sep. 2, 2021

(51) Int. Cl.
| | |
|---|---|
| G06Q 50/34 | (2012.01) |
| G06Q 40/04 | (2012.01) |
| G06Q 10/10 | (2012.01) |
| G06Q 50/18 | (2012.01) |
| G07F 17/32 | (2006.01) |
| G06Q 10/06 | (2012.01) |
| G06Q 30/08 | (2012.01) |
| G06Q 20/08 | (2012.01) |

(52) U.S. Cl.
CPC ....... *G06Q 50/34* (2013.01); *G06Q 10/06316* (2013.01); *G06Q 10/10* (2013.01); *G06Q 20/085* (2013.01); *G06Q 30/08* (2013.01); *G06Q 40/04* (2013.01); *G06Q 50/18* (2013.01); *G07F 17/3239* (2013.01); *G07F 17/3288* (2013.01)

(58) Field of Classification Search
USPC ............................................. 463/16; 705/35
See application file for complete search history.

(56) References Cited

U.S. PATENT DOCUMENTS

| | | | | |
|---|---|---|---|---|
| 5,713,793 | A | * | 2/1998 | Holte ...................... A63F 3/081 463/1 |
| 9,855,503 | B2 | | 1/2018 | Nangia |
| 9,911,270 | B2 | | 3/2018 | LaRocca et al. |
| 9,984,535 | B2 | | 5/2018 | Odom |
| 10,159,893 | B2 | | 12/2018 | Gotkin |
| 10,343,074 | B2 | | 7/2019 | Thormann |
| 10,416,840 | B2 | | 9/2019 | Rolih |
| 10,417,872 | B2 | | 9/2019 | Heathcote et al. |
| 10,475,278 | B2 | * | 11/2019 | Ginsberg ............ G07F 17/3244 |
| 2004/0230514 | A1 | * | 11/2004 | Burgis ................ G07F 17/3288 705/37 |

(Continued)

OTHER PUBLICATIONS

Betting Exchanges: The Future of Sports Betting? RuudH. Koning' andBartvanVelzen (Year: 2009).*

*Primary Examiner* — William E Rankins
(74) *Attorney, Agent, or Firm* — Klintworth & Rozenblat IP LLP; Enrique Perez

(57) ABSTRACT

Systems and computer-implemented methods for a bet exchange. The bet exchange receives bet orders from users and matches bet-for orders with bet-against orders to generate instances of standardized bet contracts. The bet-for orders are bets on a bet event occurring, and bet-against orders are bets on a bet event not occurring. The bet events are listed in contests based on a real-life event. The bet events have a standardized payout amount, which transfers to the user that made the bet-for order when the bet event occurs, or to the user that made the bet-against order when the bet event does not occur.

21 Claims, 16 Drawing Sheets

(56) References Cited

U.S. PATENT DOCUMENTS

| | | | |
|---|---|---|---|
| 2011/0065494 A1* | 3/2011 | Kennedy | G07F 17/3244 463/25 |
| 2012/0115554 A1 | 5/2012 | Cairns et al. | |
| 2012/0221456 A1* | 8/2012 | Lutnick | G06Q 40/04 705/37 |
| 2016/0358234 A1 | 12/2016 | LaRocca et al. | |
| 2016/0358238 A1 | 12/2016 | LaRocca et al. | |
| 2016/0358248 A1 | 12/2016 | LaRocca et al. | |

* cited by examiner

PAID CONTEST AND BET CONTRACT EXCHANGE SYSTEMS AND METHODS

BACKGROUND

The esports industry has become highly competitive in recent years. With sports gambling now being legal in many states, paid contest fantasy sports sites such as FanDuel™ and DraftKings™ have drawn millions of users in providing a platform on which to engage in fantasy sports contests based on real-life sporting events. These and other sites also provide gaming platforms in which users are able to win money.

Paid contest fantasy sports sites operate by allowing a user to select a sport to view a list of upcoming paid contests based on scheduled, real-life events in the selected sport. Each paid contest having a predetermined entry fee and a predetermined payout of prize money for the contestants based on the number of points accumulated by the contestants during the real-life events. The user selects a paid contest and is provided with a budget for selection of players to add to the player's roster. The user selects players having different, made-up salaries, which are deducted from the users' budget as the players are selected. The salaries are based on past performances of the players, particularly in the measures that allow for the users to win points based on the player's performance. When the user has filled his roster, the user enters the contest. Up until the beginning of the scheduled real-life event, the user may make changes to his roster based on updates on the fitness of the players or other factors that become relevant before the beginning of the contest.

Once the real-life events begin, the users' score are tallied as the players in their rosters perform in a way that wins the users points. The users' options for improving their scores are limited to selecting players for their rosters, which a user cannot do when the real-life event has started. At the conclusion of the real-life event, the users' scores are tallied and listed in order from highest to lowest point totals. The contest is then settled by applying the payout structure of the contest.

One problem with the current paid contest fantasy e-sport systems is that a user's success is based largely on luck. While selection of players involves the user's knowledge of and research on the players and team performances, the users lack tools to enhance their chances based on skill, or even on their knowledge and research after the event begins. Contestants may obtain odds data provided by oddsmakers and lines makers but are actually relying on their own research on the subjects of the bets. Information on the bets themselves, such as for example, how other contestants are viewing the bets and in particular, the level of risk other contestants see in the bet. Moreover, once the sporting event starts, the user is unable to affect his chances of winning. Players are given salaries based on their performance up until the game begins. Injuries may affect the projections on a player's performance, informing the contestant on the risk of selecting that player. However, once the event begins, the contestant is stuck with that player without a way of making adjustments for likely losses if the player is injured during the event. Contestants largely lack the ability to affect their chances of winning and the ability to affect the size of their winnings.

SUMMARY

In view of the above, systems and non-transitory, computer-implemented methods are provided for a bet exchange system operating on a server or other network service hardware platform and having a system database. In an example bet exchange system, a data network connection enables the system to communicate over a data network with a plurality of client devices. The system database stores bet records and executable programs configured to receive and send communications over the data network, and to perform program functions of the bet exchange system. A plurality of bet orders is received electronically over the data network. The bet orders comprise digital data records containing data for buy orders and sell orders for bet-for positions on a bet event in a real-life event occurring and bet-against positions to bet on the bet event in the real-life event not occurring. Each bet order includes a limit amount. A processor executes the executable instructions for program modules of a bet exchange application. The program modules include, for example, a bet exchange core module configured to match buy-to-open (BTO) orders with sell-to-open (STO) orders and to generate instances of two-party standardized bet contracts. Each instance of standardized bet contracts creates a bet-for position for a first contestant and a bet-against position for a second contestant. The standardized bet contracts include a standardized payout amount and a bet event identifier. The standardized bet contract generator compares the limit amount of the bet orders to determine a trade amount for a match that does not exceed the limit amounts of the bet orders. A fulfillment module manages a transfer of an amount based on a final trade value of the instances of the standardized bet contract and the standardized payout amount to the contestants holding bet-for positions when the bet event has occurred or to the contestants holding bet-against positions when the bet event has not occurred.

In one aspect, the bet exchange system may receive different types of orders to open or close bet positions on the bet events. A contestant may send buy orders or sell orders to bet-for or bet-against a bet event happening. Four types of orders are received by an example implementation. A contestant may open a bet-for position by sending the system a buy-to-open (BTO) order. A contestant may open a bet-against position by sending the system a sell-to-open (STO) order. Once contestants have bet positions, the contestants may send orders to close bet positions. For example, a contestant may close or modify a bet-for position by sending a sell-to-close order (STC). A contestant may close or modify a bet-against position by sending a buy-to-close (BTC) order.

In another aspect, a non-transitory, computer-implemented method operating on a server and having a system database is provided. An example method comprises receiving a plurality of bet orders over a data network from a plurality of client devices associated with a plurality of users entered in a contest based on a real-life event. The bet orders include digital data containing data for buy orders and sell orders for bet-for positions on a bet event in a real-life event occurring and bet-against positions to bet on the bet event in the real-life event not occurring. Each bet order includes a limit amount and an order type, which includes order types of bet-to-open ("BTO") order for bet-for open orders or a sell-to-open ("STO") order for bet-against open orders. The limit amount of the BTO orders are compared with the limit amount of the STO orders to determine a trade amount for a match between BTO and STO orders. The trade amount is based on the limit amount of the BTO order or the STO order.

An instance of a standardized bet contract is formed between a BTO order and a STO order when the highest buy order crosses the lowest sell order (from a bet-for perspective) which creates enough to fund the standardize d payout in escrow. The BTO order and the STO order become a bet-for position and bet-against position, respectively, in the instance of the standardized bet contracts. The bet positions belong to the contestants that sent the bet orders. Upon fulfillment, the instances of the standardized bet contracts settle by transferring an amount based on the standardized payout amount and the shares held in the instances of the standardized bet contract to the contestants holding bet-for positions when the bet event has occurred or to the contestants holding bet-against positions when the bet event has not occurred.

DETAILED DESCRIPTION

Figure 1:
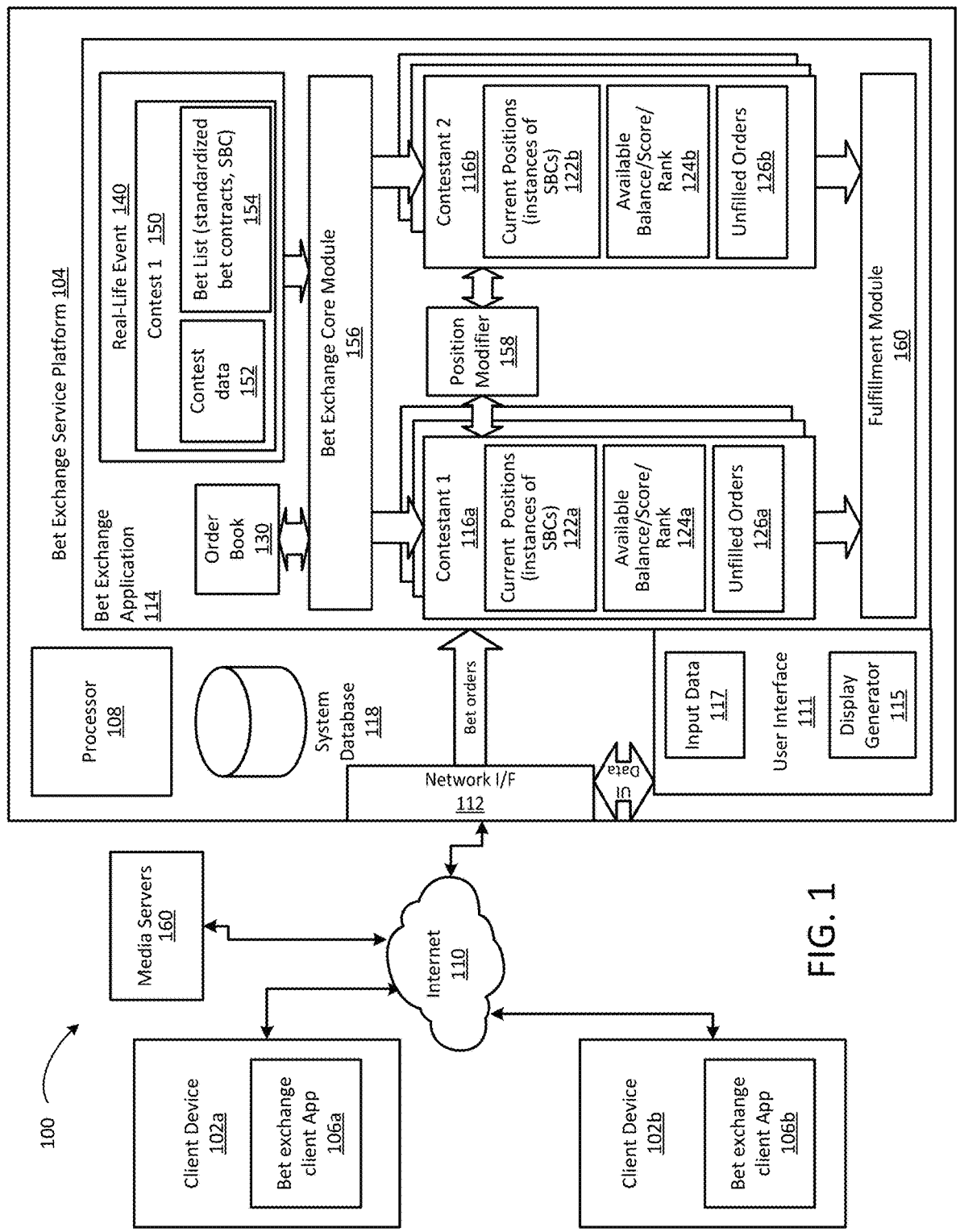
FIG. 1 is a block diagram of an example implementation of a system for a bet exchange system.

Disclosed below are systems and methods for implementing a virtual, two-party standardized bet contract exchange platform operating on a computing system (e.g. server, a cloud computing environment, etc.). The platform provides users communicating with the system over the Internet using client devices with a new way to play and keep score in daily fantasy contests of skill. For each individual real-life event in which multiple fantasy contests of skill are based, different two-party standardized bet contracts are created with the ability to float in value based on the values entered by the contestants. The standardized bet contracts correspond to bet events, or milestones that may or may not happen. The contestants use an order entry system to bid, initially, on "for" or "against" positions on the bet events identified in the standardized bet contracts. Bet-for positions are bets on the bet event happening. Bet-against positions are bets on the bet event not happening.

When bet orders match, or are filled or executed, instances of the standardized bet contract are created and the contestants that are parties to the instances of the standardized bet contracts are said to have taken bet positions in the standardized bet contract. The bet exchange platform matches bet-for open and bet-against open orders to match, fill or execute the instances of the standardized bet contract. Contestants may also bid on or enter orders to close existing positions or open new ones once the contestant has bet-for or bet-against positions. The bet positions that contestants take in the instances of standardized bet contracts may rise and fall in value based on matched orders. The value of the standardized bet contracts at the time the instance of the contract is generated is based on the amount that each contestant is willing to pay on the bet event happening or not happening. The value of the contract may then change as other contestants send bet orders on the bet event and the bet orders are matched.

A bet quote may be maintained for each standardized bet contract and displayed to contestants as described below with reference to FIGS. 11-15, which depict various user interfaces. The bet quote may include information about the value of the bet to enable contestants to assess a risk of placing a bet on the bet event. Such information may include more or less, the last trade value, the highest amount bet, the lowest amount bet, and/or other types of information.

The occurrence of the bet event may be subject to probabilities or statistics of the performance of the player or players that are the subject of the bet event. For example, the bet event may be whether or not Mitch Trubisky, the Bears quarterback, scores three touchdown passes in a specific football game. A contestant may bid for either a bet-for position on Trubisky scoring three touchdown passes in the game against the Lions, or a bet-against position on Trubisky scoring three touchdowns. Contestants can research Trubisky's past performances and the Lions' ability to stop Trubisky and other quarterbacks. The contestant may research factors related to venue, weather, injury reports, news reports on the Lions fitness, news reports on Trubisky's fitness, and other relevant factors before determining the best order-making strategy to pursue.

The contestant may place orders to open bet-for or bet-against positions on any of the bet events that are in the contest. A contestant places a buy-to-open order (BTO) to place an order on a bet-for position. A contestant places a sell-to-open order (STO) to place an order on a bet-against position. Once a contestant has opened positions, the positions may be closed, partially closed, added to, or held. A bet-for position (made with a BTO) may be closed or partially closed when the contestant places a sell-to-close (STC) order. A bet-against position may be closed or partially closed when the contestant places a buy-to-close (BTC) order.

Entry into the contest may require an entry fee, which may be paid using a user money account that may be part of a user account or profile. Upon entering the contest, the contestant is provided a starting amount stored as an available balance for use by the contestant in the contest in which entered. The available balance may be stored as a number of points or an amount in currency and is the same amount for all contestants. The amount in the available balance may be used as a source of funds from which the contestant can place bet orders. A value based on the standardized payout amount of a standardized contract is transferred to the contestant that has the bet-for position when the bet event occurs with finality and to the contestant that has the bet-against position when the bet event does not occur with finality. The value based on the standardized payout amount is added to the available balance of the contestant with the winning bet position. In example implementations, the payout amount may be standardized in that the amount is the same payout for all contests. In some implementations, the payout amount may vary with contests depending on different factors, such as for example, the entry fee of the contest, or other suitable factors.

In example implementations, contestants may take positions in a standardized bet contract in multiple shares. For example, contestants may place orders as bet orders that include an order type (e.g. BTO, STO, BTC, STC orders), a limit amount, and a share quantity. The share quantity effectively multiplies a contestant's position, amount risked, and amount won or lost. A contestant's BTO order may be for a share quantity at a limit amount per share. The total amount the contestant bets would be the standardized payout amount multiplied by the share quantity. Should the bet-for position win the bet event, the amount won by the contestant would be the standardized payout amount multiplied by the share quantity. Examples are described further below with reference to FIGS. 5A and 5B.

The bet orders have the potential of affecting the value of bet positions, which may be assessed by a contestant using the bet quote. In an example implementation, a bet quote includes a high buy value, a low sell value (from the bet-for perspective), and a last trade value. The high buy value is the highest amount per share of all of the unexecuted buy orders that are open on the order book at any given point in time. The low sell value is the lowest amount per share, from the bet-for perspective, of all of the unexecuted sell orders that are open on the order book at any given point in time.

The high buy value and low sell value for each standardized bet contract may be displayed to contestants in the bet quote and updated in real-time as the values are changed. For example, when a buy order is received, it is compared with existing unfilled sell orders to determine if the received buy order is immediately executable. If it is, an instance of the standardized bet contract is generated and the high buy value in the bet quote does not change. If, however, no unfilled sell order can create a match with the buy order, the buy order is stored in an order book. If the limit amount per share indicated in the received buy order is higher than the current high buy value in the bet quote, the high buy value is changed to the limit amount per share of the received buy order.

Similarly, when a sell order is received, it is compared with existing unfilled buy orders to determine if the received sell order is immediately executable. If it is, an instance of the standardized bet contract is generated and the low sell value in the bet quote does not change. If, however, no unfilled buy order can create a match with the received sell order, the sell order is stored as unfilled in the order book. If the limit amount per share indicated in the received sell order is lower than the current low sell value in the bet quote, the low sell value is changed to the limit amount per share of the received sell order.

When instances of standardized bet contracts are generated, the trade value of the generated standardized bet contract becomes the last trade value in the bet quote. The changes in these values in the bet quote informs contestants as to the value of the bet and the risk of betting for one side or the other. The floating value of the bet provides liquidity as well as data reflecting odds on the event occurring.

Multiple contests may be created for any of the real-life events. Each may have different entry fees, different payouts, different payout structures, or other differences. In an example implementation, contests created for the same real-life event use the same set of bet events and the same standardized payouts. In this way, the orders from all of the contests based off of the same real-life event have the same impact on the value of positions. It also makes the positions more liquid and reactive to changing conditions.

As described above, the buy and sell orders received from client devices are first checked to determine if they are immediately executable. If an existing unfilled order can be matched with a newly received order, the two orders enter into a standardized bet contract. If a newly received bet order cannot be immediately executed, the bet order is added to an order book. The bet orders may also be separated so that the order book may have a buy side and a sell side. Buy orders are stored on the buy side of the order book, and sell orders are stored on the sell side. The bet orders may also be sequenced in order of value first, then in order of time received for orders having the same limit amount per share. Buy orders may be sequenced from highest to lowest. In an example implementation, sell orders may be sequenced lowest to highest from a bet-for perspective. In an example implementation, the order book contains all unfilled bet orders on the same bet event for all contests in which the bet event is offered for bidding. In this way, the value of a bet may be affected by a greater number of contestants adding liquidity to the bet exchange.

As noted above, bet orders may include a limit amount per share and a share quantity for a given order type. The limit amount indicates a maximum amount the contestant is willing to pay to make the bet. In an example implementation, contestants enter orders with a limit amount per share from the perspective of the bet-for order. The amount actually paid by the buyer and the seller depends on the order type, the share quantity, and the standardized payout amount. When a buy order meets a sell order a trade amount per share is determined. The trade amount per share between a received bet order and an unfilled bet order in the order book is the limit amount per share of the bet order in the order book (or more generally, the bet order that was received first in time) from the perspective of the bet-for order. When (for example) a STO order is received and meets an unfilled BTO order in the order book, the trade amount per share is determined to be the limit amount of the BTO order. Since the limit amount per share of the received BTO order is the value from the bet-for perspective, the limit amount per share is used as the trade amount per share in the match. The BTO order maker would pay the trade amount per share multiplied by the maximum number of shares that can be bought by the match. If the share quantity in the BTO order is less than or equal to the share quantity indicated in the STO order, then the match is made for the share quantity in the BTO order. Otherwise, the match is made for the share quantity in the STO order. In generating instances of the standardized bet contract from the match, the STO order maker pays an amount equal to the standardized payout amount minus the trade amount per share with the difference multiplied by the share quantity of the match.

When (for example) a BTO order is received and meets an unfilled STO order in the order book, the trade amount per share is determined to be the limit amount per share of the STO order from the bet-for perspective. The trade amount per share from the bet-for perspective limit amount per share in the STO order. The BTO order maker would pay the limit amount per share multiplied by the number of shares indicated in the share quantity of the match. The STO order maker pays an amount equal to the standardized payout amount minus the trade amount per share with the difference multiplied by the share quantity of the match.

Similarly, when a BTO order meets a STO order, and the STO order is entered before the BTO order, trade value is the amount of the STO order as it was entered from the bet-for perspective. In other implementations, the trade value of a standardized bet contract between the two orders may be the standardized payout amount minus the limit amount of the STO order when entered as the most the STO order maker is willing to pay to own a bet-against position. If the standardized payout amount minus the trade value (limit amount of the STO order) is less than or equal to the limit amount of the BTO order, the standardized bet contract is executed, and an instance of the standardized bet contract is generated.

After a contestant's bet order is filled and becomes a bet position in a standardized bet contract, the contestant can hold the bet position, partially close the positions, fully close the position, or add to the position as factors change. Contestants can also edit their bet positions after the real-life event on which the bet is based has started. The contestant can partially close the bet position by adding to the position or by closing the position entirely.

A contestant may add to, partially close, or fully close a bet position by placing a BTC or STC order. For example, a contestant having a bet-for position on a bet event may edit or close the position by sending a STC order. A contestant may want to close a bet-for position because something may have happened to change the odds of the bet event happening. The contestant may then want to cash out on the bet event at a new higher value (if the bet event is more likely to happen) or at the same or at a new lower value (if the bet event is less likely to happen and the contestant is cutting losses).

The STC order may be matched with a BTO order or a BTC order. When the STC order meets a BTO order, the prior bet-for position is closed at, likely, a new value for the contestant making the STC order. The bet-for position at the new value is transferred to the BTO order maker. When the STC order meets a BTC order, the STC order maker receives the last trade value of the match and the BTC order maker receives the standardized payout amount minus the last trade value. The bet positions of the STC order maker and the BTC order maker both disappear.

Further for example, a contestant having a bet-against position on a standardized bet contract may fully close or partially close the position by sending a BTC order. The contestant may want to cash out of the standardized bet contract at a new higher value (if the bet event is less likely to happen) or at the same or at a new lower value (if the bet event is more likely to happen and the contestant is cutting losses). The BTC order may be matched with a STO order or a STC order. When the BTC order meets a STO order, the prior bet-against position is closed at, what is likely, a new value for the contestant making the BTC order. The bet-against position at the new value is transferred to the STO order maker. When the BTC order meets a STC order, the BTC order maker receives the standardized payout minus the last trade (value of bet against position) and the STC order maker receives the value of the bet-for position (same as last trade).

As noted above, the bet exchange system operates on a computing device, such as a server or multiple servers, or in a cloud computing environment. In the following description, it shall be understood that bet orders, bet positions, user accounts, money balances, point balances, bet contracts, contests, standardized bet contracts, and other terms used below in describing the bet exchange system correspond to data records suitably structured and stored in a system database.

FIG. 1 is a block diagram of a bet exchange system 100. The bet exchange system 100 includes a bet exchange service platform 104 connected to the Internet 110 and configured to communicate over the Internet 110 with client devices, such as a first client device 102a and a second client device 102b as shown in FIG. 1. Users of the bet exchange system 100 access the exchange services and features using the client devices 102a, b. The client devices 102a, b may be computing devices such as smartphones, tablets, laptop computers, desktop computers, thin-client computers, and other types of devices configured to communicate over the Internet 110 and to operate a betting service app 106. Each client device 102a, b shown in FIG. 1 includes the bet exchange client application (or app) 106a, b, respectively, to provide the users, or contestants, with access to the features of the bet exchange system 100.

The bet exchange service platform 104 includes the hardware and software components for implementing a bet exchange, such as for example, a processor 108, a user interface 111, a data network interface 112, a bet exchange application 114, and a system database 118. The processor 108 may be a computing element or elements that may be configured to provide a bet exchange service to multiple users over the Internet 110 and having sufficient processing power and speed to perform bet trading in high volumes. Such a computing element may be implemented in the form of one or more servers, or a comprehensive computing services platform such as the type provided by cloud computing.

The data network interface 112 connects the bet exchange service platform 104 to the Internet 110 to communicate with the client devices 102a, b. The bet exchange service platform 104 may also connect through the Internet 110 with media services for information related to contests or bet events in general. For example, the bet exchange service platform 104 may monitor the status of real-life events having standardized bet contracts on which contestants have taken bet positions. Such real-life events may include for example, sporting events, or other events happening and being reported in the media. The system database 118 includes any memory storage required for operation of the bet exchange service platform 104. The system database 118 may store executable programs that comprise a bet exchange application 114. Some of the memory components may be accessible from servers over the data network 110. Software components such as executable code for the bet exchange application 114 may be stored and executed on one or more servers, or in a cloud software service.

A user interface module 111 may be used to manage information to be provided to the contestants on the corresponding client devices. A display generator 115 may format display screens with prompts, or data input fields to allow contestants to select contests and bet events, enter requests for bet orders, requests to receive bet quotes, and requests for a bet order with an order type and a limit amount. An input data interface 117 may receive data from the contestants at their client devices in an appropriate context for fulfilling the above requested actions.

The system database 118 also stores data records corresponding to data objects generated and processed in the bet exchange system. For example, the system database 118 may store data records that correspond to real-life events as real-life event data 140. Such real-life event data 140 may include data related to events in sports such as American football, football (or as it is known in the United States, soccer), baseball, basketball, hockey, or any sport having a fanbase of potential users. The real-life event may also be a non-sporting event. For example, a contest may be created around a presidential election and a bet event may be, for example, whether a candidate will win the 2020 presidential election for $10. The entertainment world may be another area in which real-life events may be a source of bets. For example, a contest may be created around the series "Game of Thrones," and bets may involve, for example, "Arya Stark to kill the Night King for $10." The real-life event 140 data stored in the system database 118 includes the date and time of the real-life event and a contest list 150. The example illustrated in FIG. 1 depicts a real-life event 140 having a single contest 150 named "contest 1", however, any number of contest 150 records may be created as users create contests forming eventually forming a list of the contests 150 available for the real-life event.

Each contest 150 in the contest list includes contest information 152, such as a title, a description, a standard payout amount, an entry amount, and any other information that would be of interest to the contestant when displayed on the contestant's client device 102. Each contest 150 also includes a bet list 154 comprising at least one standardized bet contract. In an example implementation, each standardized bet contract is a data record comprising a bet event identifier, a standardized payout amount, and a bet quote. Each standardized bet contract corresponds with the bet event for which it was created. A bet event is any conceivable event that may or may not happen and on which contestants may place a bet on whether or not the event happens. Bet events may include a subject such as, for example, a player in a sporting event, a statistical milestone such as, for example, a performance goal. One example of a bet event may be a quarterback in a football game (e.g. Tom Brady as the subject of the bet event) throwing for 3 touchdowns (the statistical milestone). Contestants bid on bet positions in the standardized bet contracts. Each filled standardized bet contract, that is, each standardized bet contract in which a bet-for order meets a bet-against order, is an instance of the standardized bet contract. Each instance of the standardized bet contract further includes a bet-for position and a bet against position. In example implementations, instances of standardized bet contracts further include a share quantity indicating a number of shares for which the bet positions are opened. The bet quote for each standardized bet contract may be provided with each instance of the standardized bet contract to provide to the contestants having the bet positions on the standardized bet contract information relating to the potential value of the bet.

The bet exchange application 114 creates and manages a plurality of contestant entries 116*a, b* comprising information relating to the contestant's fantasy roster, or entry into the contest 150. FIG. 1 depicts two contestant entries 116*a* and 116*b* for contestants 1 & 2, respectively, each contestant 116*a, b* being depicted as one of many contestant entries. Each contestant entry 116*a, b* includes the contestant's current positions 122*a, b*, an available balance 124*a, b*, and a list of any unfilled orders 126*a, b* placed by the contestants 1 and 2 in an order book 130 waiting to be matched.

Contestants connect to the bet exchange service platform 104 to interact with the bet exchange application 114 via the user interface device on the contestant's client devices 102*a, b*. The bet exchange application 114 generates user interface forms or displays and send the displays to the contestant client devices 102*a, b*. The user interface provides contestants with functions to open orders, close orders, review bet quotes, review bet lists, and other actions as contestants in the bet exchange system.

The bet exchange application 114 receives requests for information or actions in the form of electronic messages over the Internet 110 from the contestants. Such requests include bet orders to open positions in standardized bet contracts, or to close or modify existing bet positions.

Bet orders are received at the bet exchange application 114 from contestants in a selected contest for a bet position on one of the standardized bet contracts in the contest bet list 154. Bet orders may be sent by the contestants at any time between the time the contest is opened for betting until the time the contest is declared ended, which may be at or soon after the time the real-life event on which the contest is based is concluded.

Bet orders may be received at a queue or queues for processing on a first-received, first-processed basis. When received, bet orders are compared with any existing unfilled bet orders in the order book 130 to determine if the received bet orders can be executed. Two orders match for immediate execution based on order type and amount bet by the contestants. In an example embodiment, the received bet orders are compared with unfilled orders in the order book 130 to determine if they are immediately executable, and if not, the received bet orders remain unfilled and stored in the order book 130.

The unfilled bet orders in the order book 130 may be sequenced according to value and time of entry into the order book. The sequencing may result in a more time-efficient comparison between bet orders, which would be beneficial whenever trading is conducted in high volume.

In an example implementation, a bet exchange core module 156 performs a matching process, examples of which are described in more detail below with reference to FIGS. 2-5B. The matching process compares bet orders of different types based on order type and limit amounts entered by the contestants that made the bet orders, or order makers. An instance of a standardized bet contract is generated when a suitable comparison matches two orders based on a bet both order makers would make on opposing positions.

The instance of the standardized bet contract between two orders to open positions, such as a BTO order and a STO order, creates bet positions for both parties. A bet-for position is created for the order maker that made the BTO order and a bet-against position is created for the order maker that made the STO order. Information relevant to the bet position of each contestant is added to the current positions list 122*a, b* in each contestant entry 116*a, b*. In an example implementation, the contestant's positions list 122 may include, for each bet position in the list, the bet quote for the bet event, the total number of bets or shares taken, the amount paid for each share, and a total current value of the bet position based on the latest trade value in the bet quote. Other items of information may be added to the contestant's positions list, such as for example, a current value, a percent change in value, and other information.

The contestant's entry 116 may also include a status record 124 for storing an available balance, a score, and/or a rank. The status record 124 provides the contestant with information indicating how the contestant is performing as orders are entered in standardized bet contracts in the contest. The available balance, for example, indicates an amount of points, or currency, whether actual currency or points, that the contestant can use to open orders in a contest. Each contestant is provided a starting amount when the contestants enter the contest. As the contestants open bet positions, the amount bet is transferred from the available balance to an escrow, which in example implementations may be a data record storing an amount in points or currency as an escrow for bet positions made and not yet been fulfilled. When a contestant closes a position, an amount based on the bet order made to close the bet position is transferred from the escrow to the contestant's available balance.

The status record 124 may also include a score, which may be used as a tally of the contestant's score or indicator of performance. Unfulfilled bet positions, that is, bet positions that have not been finalized with payouts distributed to winning contestants, have a value referred to as a trade value. The trade value can change at any time until the bet event on which the bet order is placed has finalized. The trade value of unfulfilled bet positions may be part of a contestant's score. The score may be used to rank the contestants in any of the contests.

In example implementations, the bet exchange application 114 includes a bet position modifier 158 to implement the closing of and the adding-to of existing positions. The standardized bet contract generator 156 matches BTC and STC orders with open or close buy and sell orders as described below with reference to FIGS. 5A-6. The bet position modifier 158 performs the modifications to the bet positions that each contestant holds in the relevant transaction.

Contestants may make buy or sell orders that may not execute for a not insignificant amount of time. Such orders may remain unfilled for a substantial amount of time, or in some cases, may never get filled or matched. Unfilled orders may be stored as data records corresponding to the contestants that placed the orders in an unfilled order list 126a, b in the contestant entries 116a, b, respectively. The unfilled orders in the unfilled orders list 126a, b also correspond to unfilled orders stored in the order books. In an example implementation, the current positions in the current positions list 122a, b and the unfilled orders list 126a, b may be viewed as a contestant's roster for a given contest 150 created for the real-life event 140.

When the real-life event on which contests are based happens, and the bet events that are the basis for the standardized bet contracts either occur or do not occur, the system application 114 determines if the status of the bet event is final. For example, some bet events may happen before the end of the real-life event, such as when the bet event of whether a quarterback will score three touchdowns happens before the end of the football game. The quarterback may score the three touchdowns in the first quarter or may be injured and unable to complete the game before completing the three-touchdown goal of the bet event. When the system determines that the state of the bet event is final, a fulfillment module 160 may perform the fulfillment of the bet by awarding the payout to the contestant that won the bet and performing other contest cleanup, such as for example, determining a final rank, determining scores and final available balance, and other tasks. In some cases, the paid contests may be created to permit the contestants to win money. For example, an award amount may be designated for one or more players who place in certain positions in the ranking of the contestants in the contest. Such award money may be distributed at the time of fulfillment.

The bet exchange service platform 104 may provide a user account and/or profile data storage and maintenance system. Contestants may be guided to create such user accounts or profiles through the user interface employing forms with prompts for entry by the user of the relevant data. The user account data is stored and maintained for access by the user as desired. When the contestant creates the user account the user interface forms prompt the contestant via the user interface 111 for the relevant information to be stored in the user's account 122. Such information may include, for example, name and login information for performing user login and signup. The contestants 116 also are provided a notifications list 124 for storing a list of messages sent by the system to the contestant. The contestant 116 may setup an account to receive emails or text messages informing him of changes in the contests in which the user is entered. The user 116 also maintains a current positions list 126 for storing records of the state of the bet positions on which the user has bid. Data from the current positions list 126 may be displayed to the user with up to date information reflecting the value and odds of the bet positions at any time.

Figure 2:
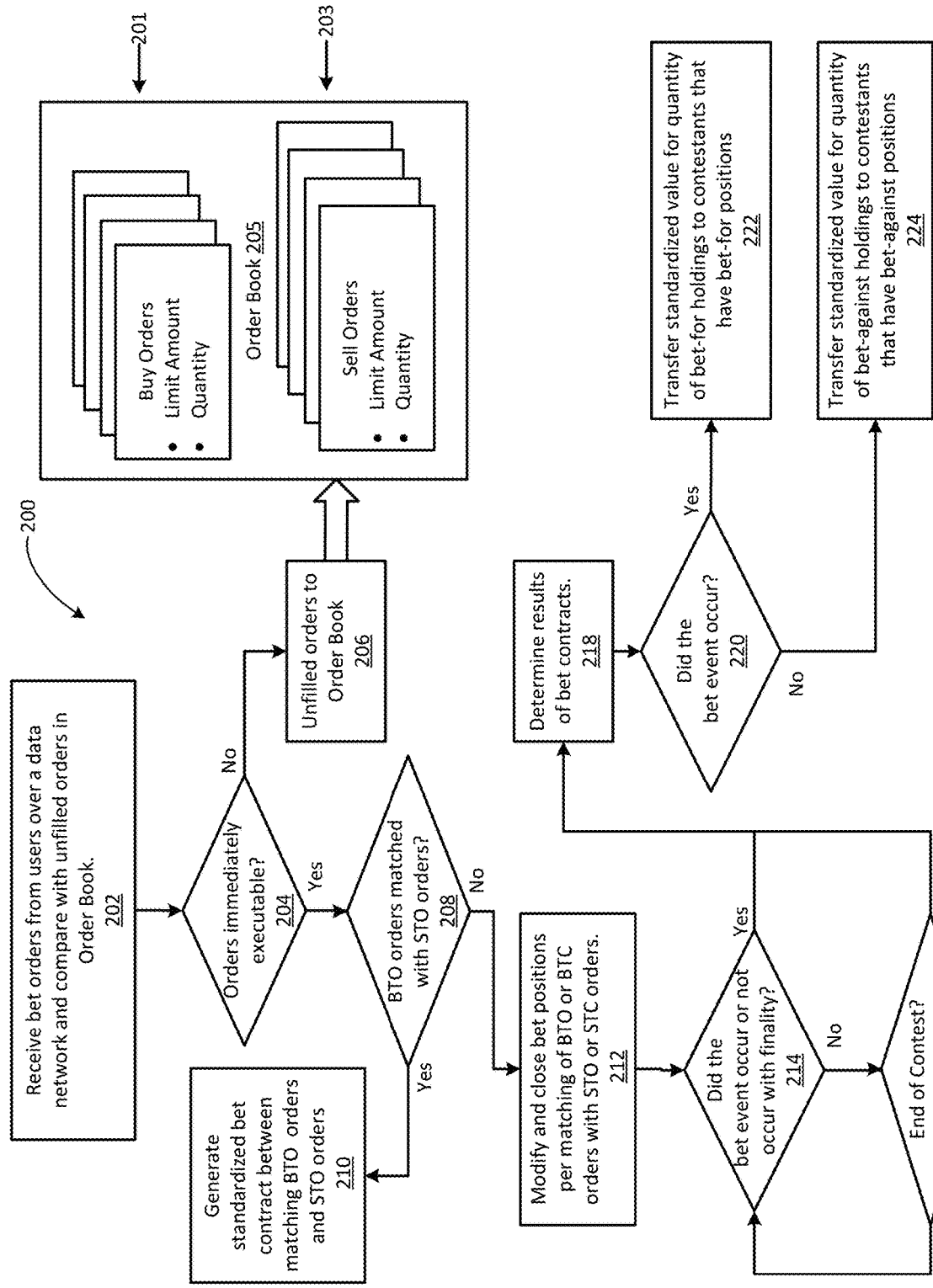
FIG. 2 is a flowchart illustrating operation of an example method for implementation of a bet exchange application in the system in FIG. 1.

FIG. 2 is a flowchart 200 illustrating operation of an example method for implementation of a bet exchange application in the system in FIG. 1. In the description of the flowchart in FIG. 2, any hardware components referenced as performing any of the functions described shall refer to components in FIG. 1 unless stated otherwise.

In an example implementation, the bet exchange system 100 operates by receiving at the bet exchange platform 104 a plurality of bet orders as shown at step 202. The bet orders are received over the Internet from client devices operated by the contestants. The bet orders are received as contestants send the orders from the client devices 102 and may arrive in large volumes in a short amount of time. Each bet order represents a bid for a bet position on one of the standardized bet contracts in the contest. In the flowchart 200 in FIG. 2, steps 202 through 216 are continually executing during the time period in which a contest is active or live. A contest is live starting from when it is activated by the system until the contest expires. A contest expires at a time after the end of the real-life event on which the contest is based. Step 202 may be continuously receiving bet orders in that time period.

At decision block 204, the bet orders received over the Internet 110 are compared with existing open bet orders, which may be bet orders in an order book 205, to determine if any of the received bet orders are immediately executable. This comparison is described in more detail below with reference to FIGS. 3-5B. Decision block 204 involves comparing the received bet orders (from step 202) with unfilled orders in the order book 205. In general, a match may be deemed executable if the value placed on the bet position for which the contestant made the received bet order substantially matches the value placed on the opposite bet position for which another contestant made the bet order in the order book 205 below a limit set by both parties. At decision block 204, if any received bet orders are not immediately executable (i.e. no matching opposite bet orders were found in the order book 205 during the comparison), the unmatched received bet orders are moved into the order book 205 as unfilled bet orders at step 206.

The bet orders may be bet-for orders or bet-against orders. In an example implementation, bet-against orders are also referred to as sell orders and bet-for orders are also referred to as buy orders. The unfilled bet-against, or sell, orders may be stored on a sell side 203 of the order book 205 separate from bet-for orders, or buy orders, which may be stored on a buy side 201 of the order book 206. The limit value in the buy order represents a maximum amount the buy order maker is willing to bet on the bet event happening. The limit amount in the sell order represents the maximum amount the order maker would like to see the trade executed at from the bet-for perspective, which will cap the amount they are willing to pay at Standardized Payout value minus the trade value from the bet-for perspective.

As an example, contestant 1 (FIG. 1) may communicate a bet order for a bet-for position at a set limit amount, which the bet exchange system 100 receives as a bet by contestant 1 that the bet event will happen. The decision block 204 compares contestant 1's bet order with unfilled sell orders in the order book 205. The decision block deems the buy order received from contestant 1 executable when an unfilled sell order made by another contestant, contestant 2, for example, is found in the order book 205 such that the limit value of the unfilled sell order would not violate the limit value of the received buy order.

In an example implementation, bet orders may specify a quantity of positions, or shares. If two bet orders to open positions meet, the bet orders are deemed executable and an instance of a standardized bet contract is generated for a quantity equal to the lower quantity specified in the two matched bet orders. The bet order having the higher quantity becomes an unfilled bet order for the same limit value as the bet order having the higher bet quantity with a quantity of shares equal to the quantity of shares that remained unfilled.

As noted above, the bet orders are for one of two types of bet positions: a bet-for (or buy) position and a bet-against (or sell) position. The orders may be placed to open or close either type of bet position. In an example system, four types of orders may be received:
1. Buy-to-Open ("BTO") order: Order to open a desired number of bet-for (or buy) shares to bet on the bet event occurring at a limit amount, which indicates the maximum amount the contestant is willing to bet.
2. Buy-to-Close ("BTC") order: Order to close a desired number of bet-against shares previously made by the contestant. The limit amount in the BTC order indicates the maximum amount the contestant is willing to pay to close the indicated number of shares in the position, which may be more or less than the amount the contestant paid to acquire the bet position.
3. Sell-to-Open ("STO") order: Order to open a desired number of bet-against (or sell) shares to bet on the bet event not occurring at a limit amount, which indicates, directly or indirectly, the maximum amount the contestant is willing to bet. The limit amount may be said to indirectly indicate the maximum amount the contestant is willing to bet in an example implementation where the trading value of any order is viewed from the perspective of buy orders.
4. Sell-to-Close ("STC") order: Order to close a desired number of bet-for positions previously made by the contestant at a limit value, which indicates, directly or indirectly, the maximum amount the contestant is willing to pay to close the previously made sell position.

It is noted that the term "open" in reference to an order, or the term "open orders," shall refer to bet orders to add or acquire a position in a standardized bet contract that have not been filled or canceled. The term "unfilled orders" shall be used interchangeably with the term "open orders" to refer to orders that have not been filled or canceled. Position opening orders include both BTO and STO and are types of orders that, if filled, result in new positions to the order makers. Position closing orders include both BTC and STC orders and are types of orders that, if filled, result in the closure of existing bet positions. Bet positions are filled orders that are in an executed contract. A bet position may comprise a number of shares in the position in the bet event.

When a BTO order is matched with a STO order, an instance of a standardized bet contract is generated. When any combination of open orders (i.e. BTO or STO) is matched with any combination of close orders (i.e. BTC or STC), ownership in a bet position is transferred from the close order maker to the open order maker. When two close orders are matched, two existing instances of the standardized bet contract are merged into one instance of the standardized bet contract.

If at decision block 204, any newly received bet orders are deemed to be immediately executable, the process moves to decision block 208 to determine if the matched bet orders are a match between BTO orders with STO orders. At decision block 208, if a BTO order is deemed to be immediately executable with a STO order, the process moves along the YES path to step 210 to generate an instance of the standardized bet contract. If the bet orders found to be immediately executable at decision block 204 do not involve matches between BTO orders and STO orders, the process moves to step 212 (NO path). Step 212 processes matches involving any of the other four possible combinations of matches between bet orders. The first combination of matches is between BTO orders and STO orders. Step 212 processes the other three combinations, which include: BTO orders with STC orders, BTC orders with STO orders, and BTC orders with STC orders. The processing of the other three possible combinations of matches is discussed in more detail below with reference to FIGS. 4-6.

Referring back to step 210 where the instance of the standardized bet contract is generated, the match between any of the BTO orders and one of the STO orders depends on the trade amount determined when the orders beet. In one example implementation, the trade amount is the limit amount of the bet order that was placed earlier in time, which will typically be the unfilled bet order in the order book 205. That is, with respect to a match between a received bet order and a bet order in the order book 206, the trade amount would be the limit amount of the bet order in the order book 206. When a new STO order is received and compared with an existing unfilled BTO order, the limit amount of the existing unfilled BTO order is determined to be the trade amount of a bet contract that may be executed between the two orders. Such a bet contract is executed if the limit amount of the existing BTO order is equal to or higher than the STO order being entered (because entered from bet-for perspective). The limit amount of the sell order is the maximum amount the order maker would like to see the trade executed at from the bet-for perspective. If this condition is met between the newly received sell order and the buy order in the order book 206, the match is made, and the trade amount per share from the bet-for perspective becomes the last trade value in the bet quote of the bet event.

Similarly, when a new BTO order is received and compared with an existing unfilled STO order, the limit amount of the existing unfilled STO order is determined to be the basis for the trade amount of a bet contract that may be executed between the two orders. In an example implementation, the trade amount is viewed from the perspective of the buy order. The trade amount in this case may be set to the standardized payout amount minus the limit value entered in the existing, unfilled STO order. In one example implementation, the limit value entered in the existing unfilled STO order may actually be a value that represents the amount paid by the contestant that made the BTO order and reflecting the value from the buyer perspective. In that case, the bet contract is executed if the limit amount of the newly received BTO order is less than or equal to the determined trade amount (i.e. the standardized payout amount minus the limit amount of the existing, unfilled STO order).

The instance of standardized bet contract is generated at step 210 by deducting the trade amount from the BTO order maker's available balance and deducting the standardized payout minus the trade amount from the STO order maker's available balance. If a share quantity is specified in the bet orders, the limit amount per share deducted from both bet order maker available balances is multiplied by the lesser of the share quantities specified in the bet orders. In an example implementation, the amounts may be transferred to escrow, which may be defined using a data record in the system database. An escrow may correspond to a bet event so that the escrow maintains amounts relating to an individual bet event. The escrow may be used in any bet event to ensure that there are sufficient funds to payout when the bet contract settles. An escrow is funded when a standardized bet contract is generated, which is to say, when a BTO order meets a STO order. The total funded to escrow between the two order makers is the standardized payout amount, which is the trade amount (amount paid by the BTO order maker) plus the standardized payout amount minus the trade amount (amount paid by the STO order maker). Funds are drawn from escrow when the standardized bet contract settles or, when a BTC order is matched with a STC order. When a BTO or STO order is matched with a BTC or STC in any permissible combination (two opposite orders), the last trade value of the standardized bet contract transfers between the two contestants, and no amount is transferred in or out of escrow.

When the instance in the standardized bet contract is generated, the bet positions generated by the bet contract are stored in a current positions list 122 (in FIG. 1) in the contest entry 116a or b for the respective owners. The bet-for position is added to the current positions list of the contestant that made the BTO order. The bet-against position is added to the current positions list of the contestant that made the STO position. The bet-for and bet-against positions may be stored and displayed to the contestant with a bet quote having data indicative of the value and risk of the bet event. Such a display is referred to below as a contest dashboard. The bet quote includes a highest buy value indicating a highest limit amount of all bet orders for the bet event, a lowest bet-against value (from a bet-for perspective) indicating a highest positional value of all bet orders for the standardized bet contract, the last trade value indicating the trade amount of the last bet contract executed. In an example implementation, other data may be added with the bet quote to a dashboard, such as for example, historical data indicating the history of the bet value of the standardized bet contract. The bet-for position and the bet-against position in the current positions lists may also include the quantity of shares in the contracts, the amount paid for the position, and the current market value of the position.

After the standardized bet contract is executed, the contestant can monitor the floating value of the standardized bet contract by referring to the contestant's bet positions on the current positions list for a given contest as shown in the contestant's contest dashboard, or by accessing the current bet quote for a standardized bet contract in other user interface displays. The contestant may modify add to, hold, or close existing bet positions at any time before the standardized bet contracts settle, which is the time at which the real-life event on which the bet event is based has ended. It is possible for the bet event to occur at any time before the end of the real-life event. However, in some example implementations it may be preferred that the bet event expires and is therefore settled at the end of the real-life event regardless of when the bet event occurs or does not occur to ensure anything that affects the bet event does not change its occurrence.

At decision block 214 in FIG. 2, the real-life event is checked to determine if the bet event identified in the standardized bet contract has occurred or not occurred with finality before the contest has ended. For example, if the identified bet event is, for example, "Pat Mahomes will throw for three touchdowns," the bet event is deemed to have occurred with finality once Pat Mahomes' third touchdown pass becomes part of the official NFL record for the football game, or real-life event for which the standardized bet contract was created. The finality of the occurrence of the identified bet event may occur before the end of the football game.

However, it is possible that Pat Mahomes is forced to leave the football game, such as through injury or through ejection, before he has thrown his third touchdown pass. In such a scenario, the identified bet event is deemed to not have occurred with finality. It is noted that the bet exchange service platform 104 includes a data network interface 112 to communicate over the Internet 110. This access to the Internet 110 allows for easy access by the bet exchange service platform 104 to media sites 160 that may be used to monitor the status of a real-life event in virtual real time or to obtain relevant information at any time. The bet exchange application 114 may include program functions that access such information from the media and analyze the information to decide on an end to a contest, or on whether or not a bet event occurred or did not occur with finality.

If at decision block 214, the bet event of the standardized bet contract occurred with finality, the instances of standardized bet contracts for the bet event are analyzed to determine how they should be settled. Decision block 220 checks if the bet event occurred. If the bet event occurred (YES path), the standardized payout amount adjusted for the number of shares at stake is transferred to the contestants having bet-for positions in the standardized bet contract at step 222. If the bet event did not occur (NO path), the standardized payout amount adjusted for the number of shares at stake is transferred to the contestants having bet-against positions in the standardized bet contract at step 224.

If at decision block 214, the bet event of the standardized bet contract did not occur with finality (NO path), the real-life event on which the contest is based is checked to determine if the contest has reached an end at decision block 216. If the contest has not ended (NO path), the system may continue to check for whether or not the bet event has occurred at decision block 214. It is noted that until decision block 216 determines that the contest has ended, the operation illustrated by steps 202 through decision block 214 continues to proceed as bet orders continue to be received by the system. If at decision block 216, the end of the contest has been detected (YES path), the results of the standardized bet contracts are determined at step 218. Settlement then proceeds at decision block 220 and steps 222 and 224.

Figure 3:
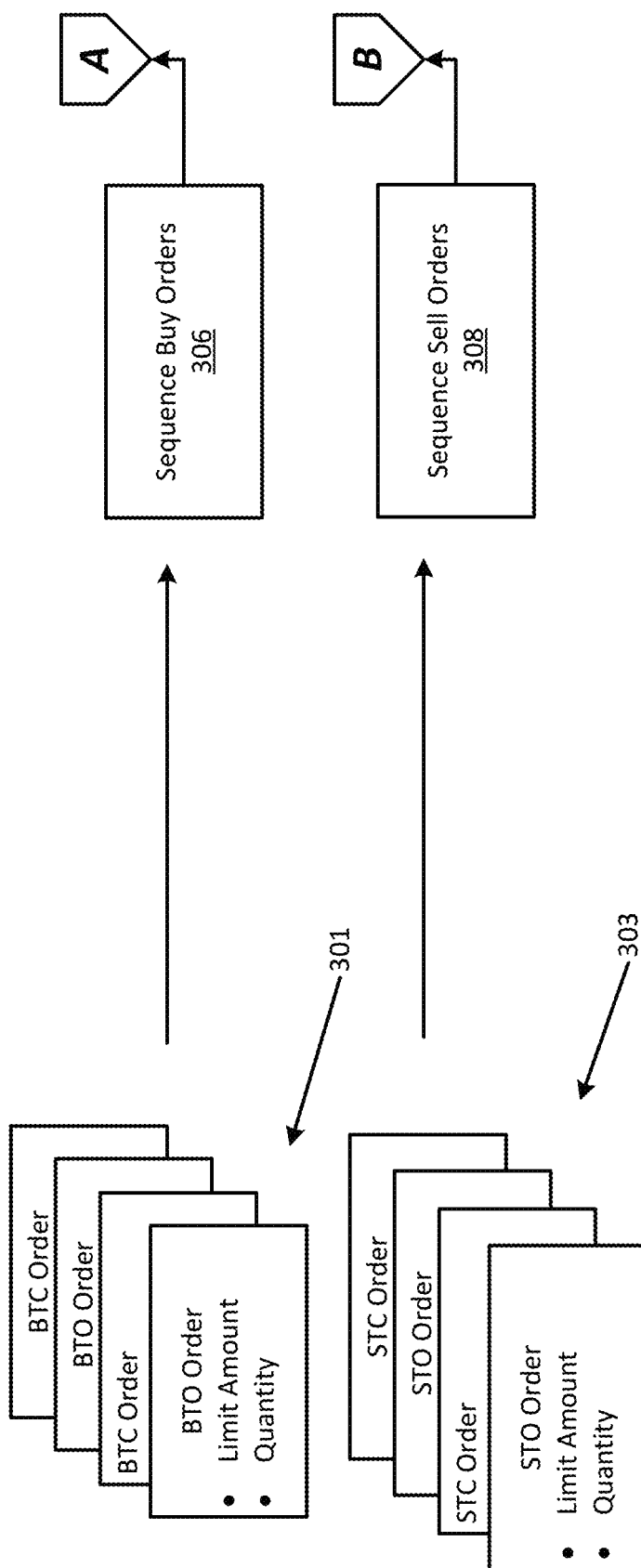
FIG. 3 is a schematic diagram illustrating a sequencing operation in the method used to implement an example bet exchange application.

FIG. 3 is a schematic diagram illustrating a sequencing operation performed by the bet exchange application 114 as bet orders are received. In an example implementation, bet orders are sequenced according to type. Bet-for (BTO or BTC) orders 301 are sequenced at step 306 separately from bet-against (STO or STC) orders 303 at step 308. It is noted that the plurality of buy orders 301 includes BTO orders and BTC orders. The plurality of sell orders 303 includes STO orders and STC orders.

The sequencing of the buy orders at 306 results in the buy orders organized in order from highest value to lowest value. The sequencing of the sell orders at 308 results in the sell orders organized in order from lowest to highest value from the bet-for perspective. That is, the sell orders are sequenced according to the value of the bet from the bet-for perspective, and not necessarily on what the sell order maker would expect to pay. Since the sell orders are entered from the bet-for perspective, the sell order maker is actually going to pay SP-LT.

Figure 4:
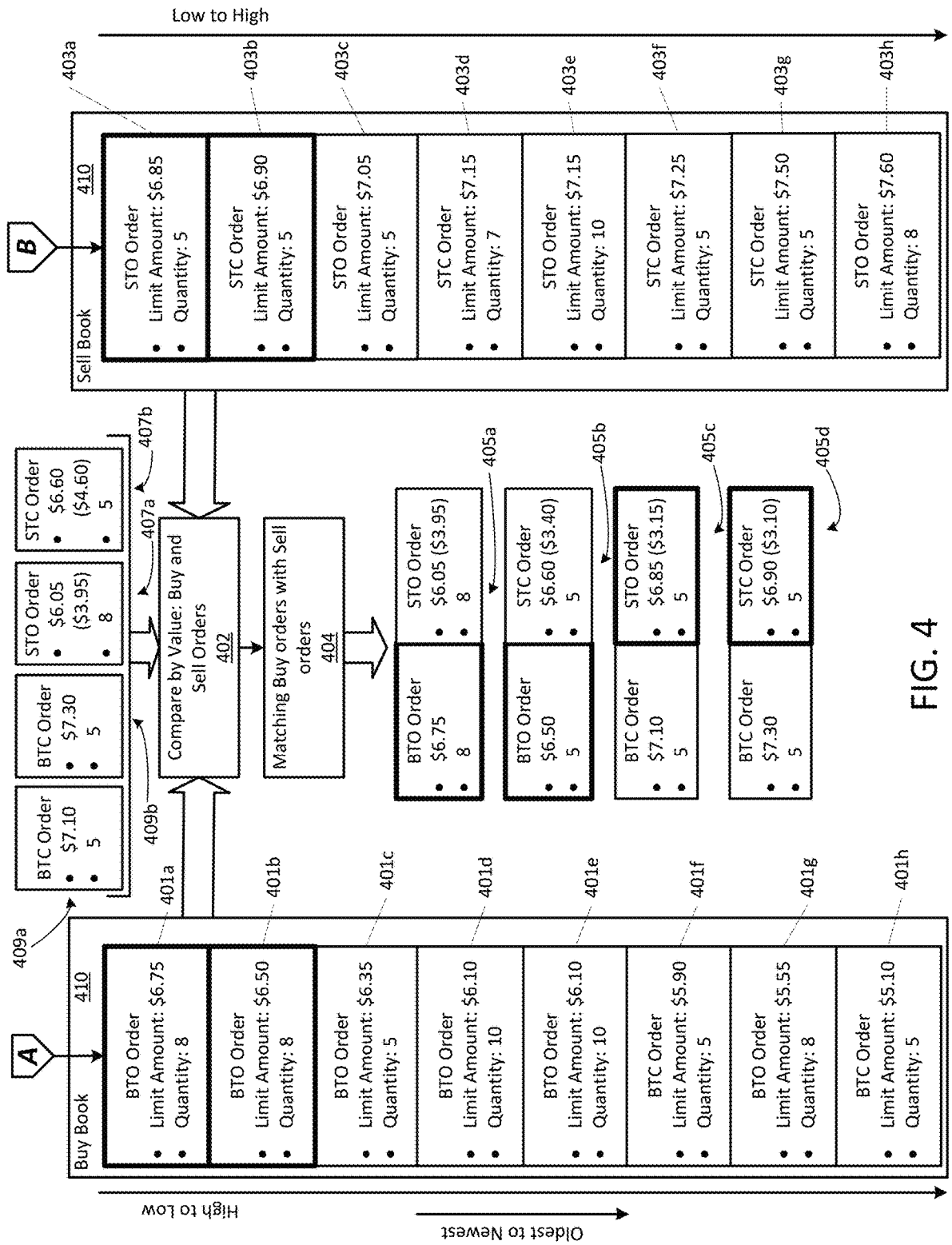
FIG. 4 is a schematic flow diagram illustrating an example matching process for matching sequenced bet-for orders with sequenced bet-against orders.

A set of sequenced buy orders 401 and a set of sequenced sell orders 403 are shown in FIG. 4. The sequenced buy orders 401 include the BTO order 401a first in the sequence with a limit amount of $6.75 and a share quantity of 8 shares. The next buy order is a BTO order 401b having a limit amount of $6.50, followed by a BTO order 401c at $6.35, a BTO order 401d at $6.10, another BTO order 401e at $6.10, a BTC order 401f at $5.90, a BTO order 401g at $5.55, and a BTC order 401h at $5.10. When two unfilled orders, such as BTO order 401d and BTO order 401e have the same value, the orders are sequenced from oldest to newest.

The sequenced sell orders 403 include the STO order 403a first in the sequence with a limit amount of $6.85 and a share quantity of 5 shares. The next sell order is a STO order 403b having a limit amount of $6.90, followed by a STO order 403c at $7.05, a STC order 403d at $7.15, another STO order 403e at $7.15, a STC order 403f at $7.25, a STC order 403g at $7.50, and a STO order 403h at $7.60. When two unfilled orders, such as STO order 403d and STO order 403e have the same value, the orders are sequenced from oldest to newest.

FIG. 4 is a schematic flow diagram illustrating an example matching process for matching sequenced buy orders 401 and sequenced sell orders 403 with bet orders that have been most recently received (received bet orders). The unfilled buy orders 401 and the sell orders 403 are stored in an order book 410 such that the buy orders 401 are separate from the sell orders 403. Unfilled buy orders 401 meet or are matched with newly received sell orders 407 to generate instances of the standardized bet contract. Unfilled sell orders 403 meet or are matched with newly received buy orders 409 to generate additional instances of the standardized bet contract. The order book 410 may include all unfilled orders for a bet event identified in a standardized bet contract for a given contest. In example implementations, the same standardized bet contract may be played in multiple contests. The contests can have different payout amounts for contest winners, or different entry fees to bet in the contest. The standardized payout amount may be the same across the contests to provide a common basis for assessing risk across the contests. The order book 410 may contain unfilled orders for the standardized bet contract in each contest in which the standardized bet contract is played. In this manner, the value of the standardized bet contract may be affected by a larger number of bet orders adding to the liquidity of the trade value of the standardized bet contract.

The sequenced unfilled buy orders 401a to 401h are compared with the newly received sell orders 407, and the unfilled sell orders 403a to 403h are compared with the newly received buy orders 409 at step 402 to determine if a suitable trade amount can be determined between pairs of opposing orders. At step 404, buy orders that match with sell orders are processed based on combinations of buy and sell orders. In an example implementation, four combination types result from the matching. The first combination 405a is an unfilled BTO order 401a matched with a newly received STO order 407a. The second combination 405b is a BTO order 401b and a STC order 407b. The third combination 405c is a newly received BTC order 409a and an unfilled STO order 403a. The fourth combination 405d is a newly received BTC order 409b and an unfilled STC order 403b. The processing of these matches 405 is described below with reference to FIGS. 5A and 5B.

Figure 5A:
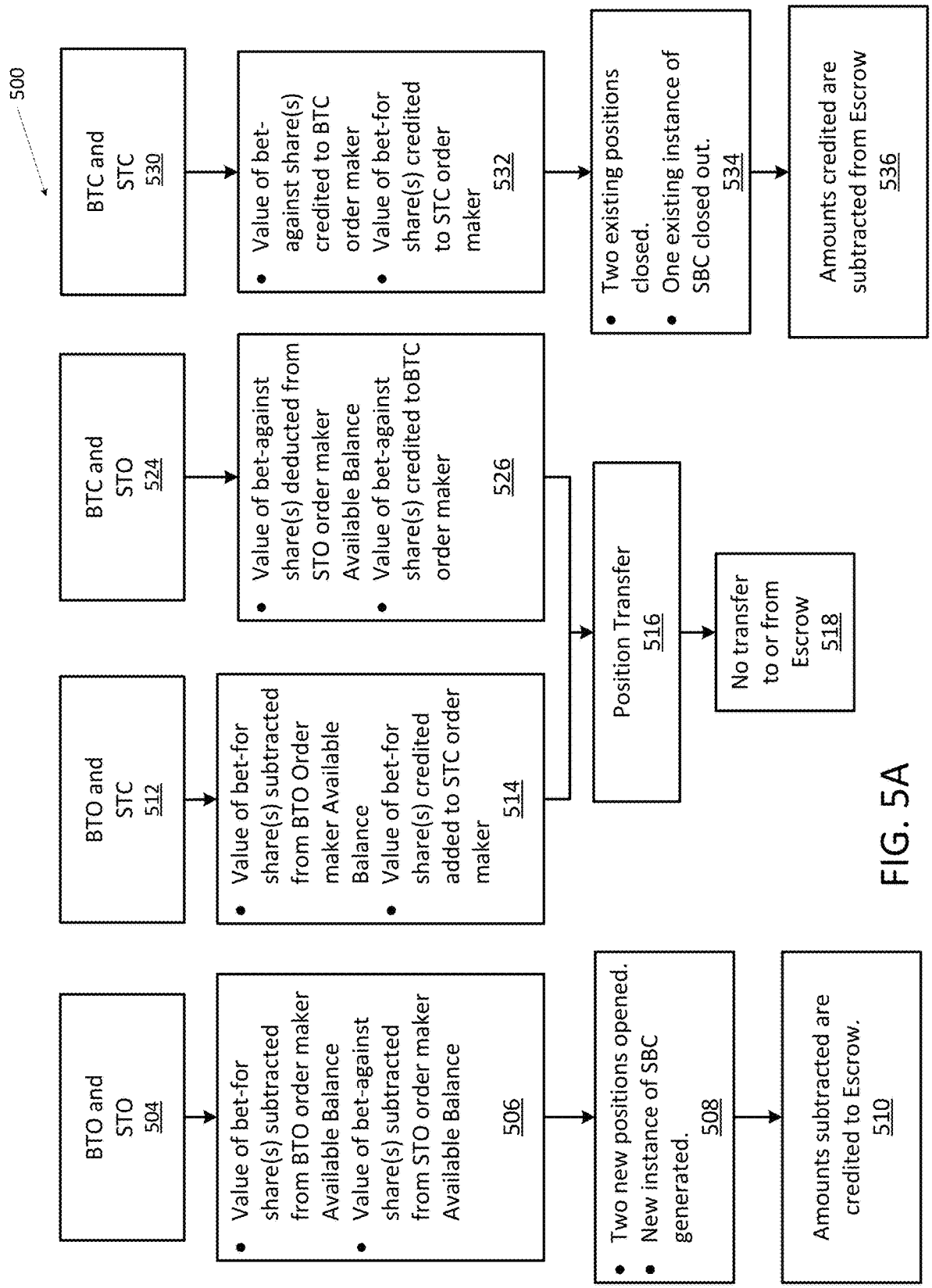
FIG. 5A is a flowchart illustrating operation of the matching different types of orders to open or close bet positions.

FIG. 5A is a flowchart 500 illustrating operation of examples of matching different types of orders to open or close bet positions. Step 504 matches a BTO order with a STO order at a determined trade amount per share. At step 506, the trade amount per share becomes the last trade value (LT). The trade amount is adjusted for a share quantity and the value of bet-for shares is subtracted from the available balance of the contestant that made the BTO order. The value of the bet-for positions, which equals the last trade value (LT), is subtracted from the standardized payout amount and the difference adjusted for the share quantity. The value of the bet-against shares is subtracted from the available balance of the contestant that made the STO order.

At step 508, an instance of the standardized bet contract is generated to create a bet-for position for the contestant that made the bet-for order and a bet-against position for the contestant that made the bet-against order. At step 510, the amounts subtracted from the contestants' available balances in step 506 are transferred to escrow.

Figure 5B:
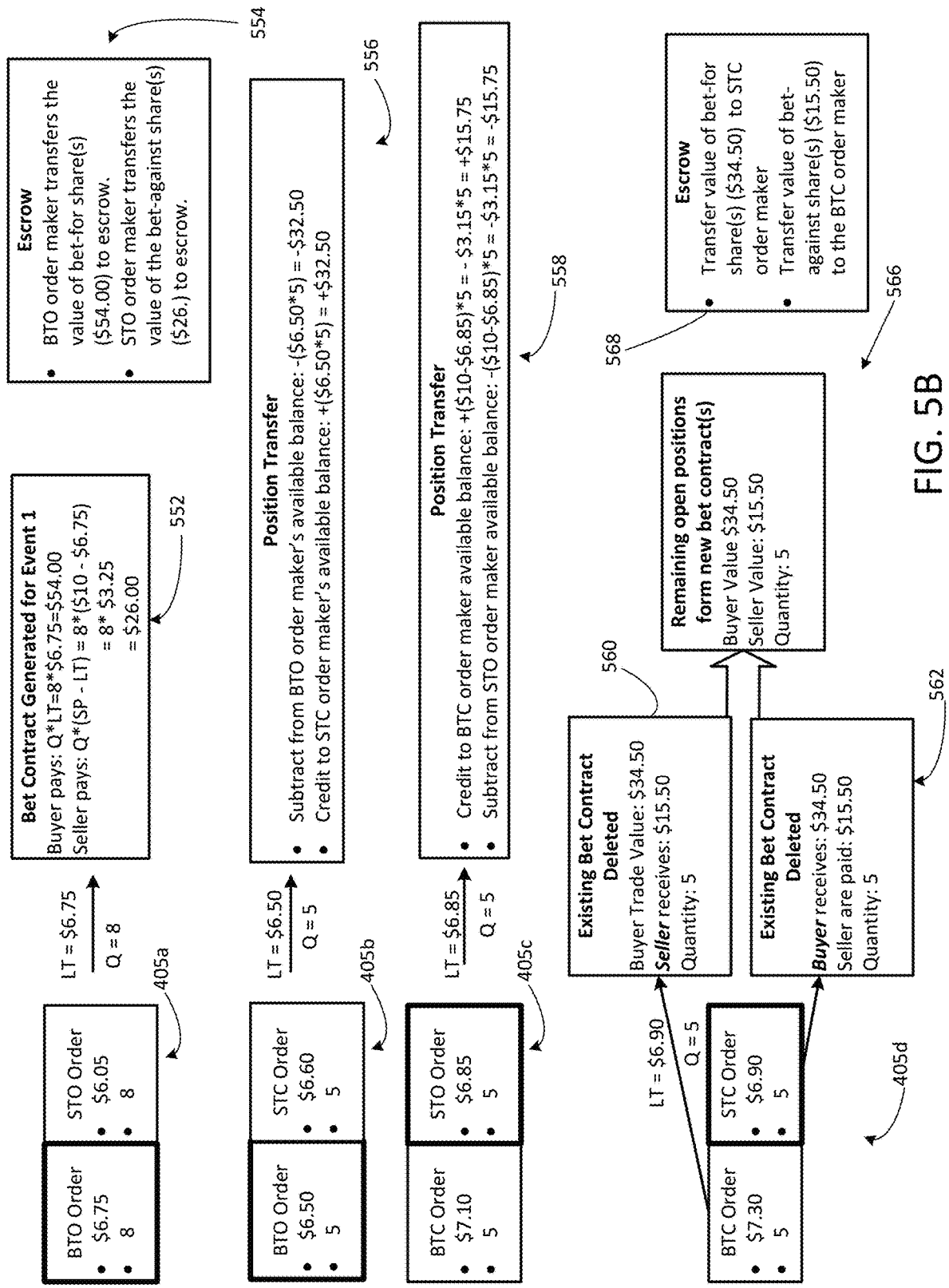
FIG. 5B is a schematic flow diagram illustrating examples of results of different combinations of matched orders.

FIG. 5B schematically illustrates the process of matching the BTO order and the STO order combination at 405a in FIG. 4. The BTO order in the combination 405a has a limit amount of $6.75 for 8 shares. The STO order has a limit amount of $6.05 for 8 positions. The trade amount is determined to be the limit amount of the BTO order as indicated by the bold border of the BTO order since the BTO order 401a is in the buy side of the order book 410 (in FIG. 4). The quantity of shares in the bet being traded in the combination 405a is 8, which is the amount available to both the BTO order (8) and the STO order (8). If the share quantity were not the same in the bet orders in the combination 405a, the match would be made for the smaller limit number between the two bet orders, and the bet order with the greater number of shares would go to the order book having a share quantity equal to the remainder of shares.

When the combination 405a is matched, an instance of the standardized bet contract 552 is created for the bet event 1 identified in the standardized bet contract. In creating the instance of the standardized bet contract 552, the buyer (BTO order maker) pays the last trade value per share ($6.75) multiplied by the share quantity (8) for the standardized bet contract. The seller (STO order maker) pays the standardized payout amount ($10 in this example, but it could be any predetermined value) minus the trade value per share (LT=$6.75, for a total of $3.25) multiplied by the share quantity for the bet contract (8). As shown in FIG. 5B, the buyer paid $54.00 and the seller paid $26.00. The amounts paid by the buyer and seller are transferred from their available balances to escrow 554.

Referring back to FIG. 5A, step 512 matches a BTO order with a STC order. At step 514, the trade amount per share becomes the last trade value per share (LT) and a value of bet-for shares adjusted for the share quantity is subtracted from the available balance of the contestant that made the BTO order. The last trade value (LT) adjusted for the share quantity of the match is added to the available balance of the contestant that made the STO order. The result is a position transfer at step 516. That is, the interest bought by the contestant that made the BTO order is transferred to the contestant that made the STC order indicating the contestant that made the STC order is "selling" his existing bet-for position to the BTO order maker. No transfer in or out of escrow follows this match as indicated at step 518.

Referring to FIG. 5B, the process of matching the BTO order and the STC order combination described in FIG. 5A is shown at 405b. The BTO order in the combination 405b has a limit amount of $6.70 for 5 positions. The STC order has a limit amount of $6.60 for 5 positions. The trade amount is determined to be the limit amount of the BTO order as indicated by the bold border of the BTO order. The quantity of shares traded in the combination 405b is 5, which is the amount available to both the BTO order (5) and the STO order (5). When the combination 405b is matched, a position transfer 556 is executed in which the trade value per share is $6.70. The available balance of the buyer (BTO order maker) is reduced by the last trade value ($6.70) multiplied by the quantity (5), which totals $33.50. The available balance of the seller (STC order maker) is credited by an amount equal to the last trade value ($6.70) multiplied by the quantity (5) for a total of $33.50. Again, the share quantities set in both bet orders in the combination 405b is the same (5). If the share quantities were uneven, the bet order with the larger number of shares is moved to the order book 410 with the same limit amount and a share quantity equal to the remainder of shares.

Referring back to FIG. 5A, step 524 matches a BTO order with a STO order. The trade amount per share is the limit amount of the STO order as indicated by the bold border at 405c (in FIGS. 4 and 5B), which becomes the last trade value per share (LT). At step 526, a bet-against share value is determined to be equal to the standardized payout minus the last trade value per share multiplied by the share quantity of the trade. The bet-against share value is deducted from the available balance of the contestant that made the STO order. In addition, the bet-against share value is credited to the contestant that made the BTO order. The result is a position transfer at step 516. That is, the BTO order maker transfers the bet-against positions that the BTO order maker owned to the STO order maker. At step 518, there is no transfer in or out of escrow.

Referring to FIG. 5B, the process of matching the BTC order and the STO order combination is shown at 405c. The BTC order in the combination 405c has a limit amount of $7.10 for 5 positions. The STO order has a limit amount of $6.85 for 5 positions. The trade value per share is determined to be based on the limit amount of the STO order as indicated by the bold border of the STO order. In this example, the last trade value per share is SP-LT=$10-$6.85=$3.15. The quantity traded in the combination 405c is 5, which is the amount available to both the BTC order (5) and the STO order (5). When the combination 405c is matched, a position transfer 558 is executed in which the trade value is $6.85. The available balance of the BTC order maker is credited by an amount equal to the standardized payout amount ($10) minus the last trade value ($6.85) multiplied by the quantity (5), which totals $3.15*5=$15.75. The available balance of the BTC order maker is subtracted by an amount equal to the standardized payout ($10) minus the last trade value per share ($6.85) multiplied by the quantity (5) for a total of $15.75.

Referring back to FIG. 5A, step 530 matches a BTC order with a STC order. At step 532, the trade amount per share becomes the last trade value per share (LT). A value of bet-against shares is determined to be the standardized payout amount minus the last trade value per share multiplied by the share quantity. A value of bet-for shares is determined to be the trade amount per share multiplied by the share quantity. At step 534, the bet positions held by the BTC order maker and the STC order maker are closed, which closes any instances to which the bet positions held by the BTC order maker and the STC order maker may have been a part of. The bet positions opposing each of the bet positions of the BTC order maker and the STC order maker remain open and may meet to generate a new instance of the standardized bet contract. At step 536, the amounts credited to the BTC order maker and the STC order maker are transferred out of escrow.

FIG. 5B schematically illustrates the process of matching the BTC order and the STC order combination at 405d. The BTC order in the combination 405d has a limit amount of $7.30 for 5 positions. The STC order has a limit amount of $3.10 for 5 positions. The trade value is determined to be the limit amount of the STC order as indicated by the bold border of the STC order. When the combination 405d is matched, an existing position belonging to the BTC order maker in the instance of the standardized bet contract 560 has the bet-against position (seller) eliminated. The existing bet-against position in the instance of the standardized bet contract at 560 is effectively sold by the BTC order maker for the value of the bet-against shares, which is $6.90*5=$34.50. In the matching of the combination 405d, an existing position belonging to the STC order maker in the instance of the standardized bet contract 562 has the bet-for position (buyer) eliminated. The existing bet-for position in the instance of the standardized bet contract at 562 is effectively sold by the STC order maker for the value of the bet-for shares, which is ($10−$6.90)*5=$15.50.

The instance of the standardized bet contract at 560 and the instance of the standardized bet contract at 562 are eliminated. The elimination of the bet-against position in the instance of the standardized bet contract 560 leaves the holder of the bet-for position (Buyer) with a current trade value of $6.90*5=$34.50. The elimination of the bet-for position in the instance of the standardized bet contract 562 leaves the holder of the bet-against position (Seller) with a current trade value of $15.50. The holder of the bet-for position in the instance of the standardized bet contract 560 and the holder of the bet-against position in the instance of the standardized bet contract at 562 form a new instance of the standardized bet contract at 566. The transfer of the values of the bet-for shares and the bet-against shares from escrow to the available balances of the BTC order maker and the STC order maker is shown at 568.

Referring back to FIG. 4, it is noted that the highest value offered in a bet-for order in the order book 410 is the BTO order 401a, which is then matched with the newly received STO order 407a. When the instance of the standardized bet contract 552 (FIG. 5B) is generated, the BTO order at 401a is no longer an unfilled order, which means that the BTO order 401a is removed from the buy side of the order book 410. The BTO order 401b becomes the new highest value bet order for the unfilled bet-for orders in the order book 410. The BTO order 401b is then matched with a newly received STC order 407b, which means the BTO order 401b is removed from the order book 410 leaving BTO order 401c as the new highest value bet-for order.

On the sell side, the lowest value offered in a bet-against order in the order book 410 is the STO order 403a. When the STO order 403a is matched with a newly received BTC order 409a, the STO order 403a is removed from the sell side of the order book 410. The STC order 403b becomes the new lowest value offered in a bet-against order in the order book 410. The STC order 403b is then matched with newly received BTC order 409b, which means the STC order 403b is removed from the order book 410. The new lowest value offered in a bet-against order in the order book is then STO order 403c.

Figure 6:
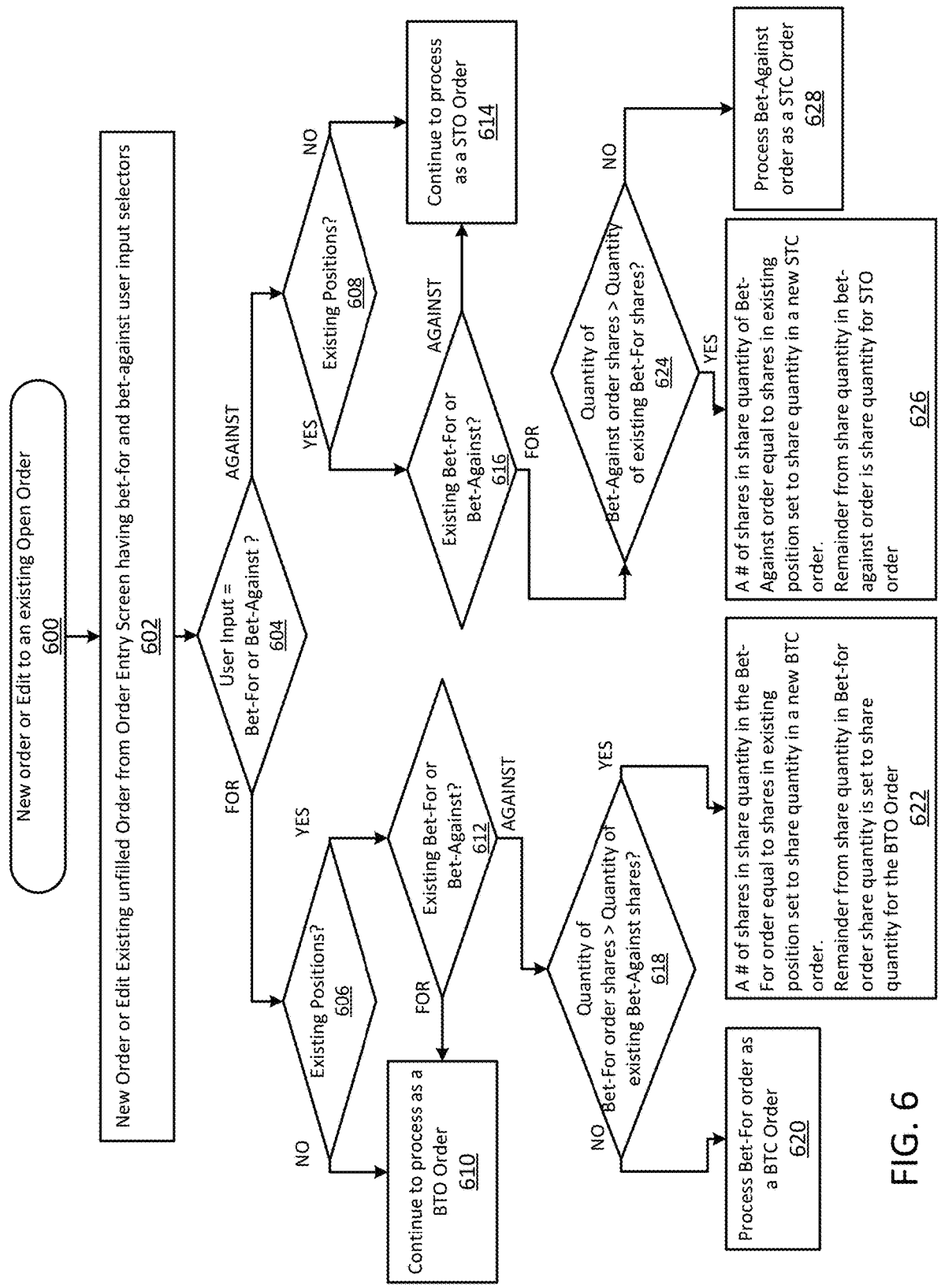
FIG. 6 is a flowchart illustrating processing of new orders when the contestant enters orders as bet-for or bet-against orders.

FIG. 6 is a flowchart illustrating processing of new orders or edits to existing open orders. In some example implementations, the user interface may include selectors in which a contestant can define a bet order and enter the bet order based on the desired action. For example, a user interface may include screens for entering limit amounts and share quantities and options to open or close, buy or sell positions. The example process illustrated in FIG. 6 may be implemented in example implementations of the bet exchange service platform 104 in which contestants are provided only a bet-for or a bet-against selector on the user interface for entering bet orders. The selection of the bet-for selector communicates a BTO order to the system and the selection of the bet-against selector communicates a STO order.

When orders are entered in such an example implementation, the bet exchange core module 156 (in FIG. 1) determines whether or not the orders can be executed immediately. In example implementations, whether or not an order can be executed depends on whether there are other orders having a value that will result in a trade value amount that does not exceed the limit value of the newly entered order. If a newly entered order cannot be executed immediately, the order is left as an unfilled order. Unfilled orders can be edited after opened and while still unfilled.

A contestant may make a new order via the user interface of the bet service app 106 (in FIG. 1) on the contestant's client device 102. In an example implementation, an order entry screen is presented to the contestant. In an example implementation, an order entry screen may be presented when a contestant wants to take a new position, add to an existing position, or close an existing position. An example of an order entry screen is described below with reference to FIG. 11. As noted above, the user interface includes a bet-for selector and a bet-against selector.

The flowchart in FIG. 6 depicts operation of a method for processing a new order or an edit to an existing unfilled order 600. The system receives input for a new order or an edit to an existing unfilled order from a suitable order entry screen at step 602. The input may be received as a BTO order or a STO order. Decision block 604 determines if the order is for a bet-for position (BTO) or for a bet-against position (STO). If the order is a BTO order, decision block 606 determines if the contestant has shares in an existing position in the standardized bet contract. If the contestant has no shares in an existing position, the bet order is processed unchanged as a BTO order at step 610. If the contestant has shares in an existing position, decision block 612 determines if the existing position is a bet-for or bet-against position. If the existing position is a bet-for position, the received BTO order is processed unchanged as a received BTO order at step 610, with the share quantity in the received BTO order adding to the shares in the existing bet-for position. If the existing position is a bet-against position, decision block 618 determines if the share quantity of the received BTO order is greater than the quantity of shares in the existing bet-against position. If the share quantity of the received BTO order is greater than the quantity of shares in the existing bet-against position, a number of the BTO order share quantity equal to the quantity of shares in the existing bet-against position is made the share quantity of a new BTC order at step 622. The remainder of the share quantity of the received BTO order is the new share quantity of the received BTO order. The BTC order effectively closes the existing shares in the bet-against position. The contestant is left with a BTO order with the number of shares in the bet-for position that exceeded the shares in the bet-against position. For example, if a contestant has 10 bet-against shares and makes an order for 20 bet-for shares in a BTO order, step 622 automatically creates a BTC order with a share quantity of 10 shares and the received BTO order has its share quantity reduced to 10 shares. At step 620, if the share quantity of new BTO order is not greater than the quantity of the existing bet-against positions, the full quantity of the new BTO order is processed as a BTC order leaving the contestant with only a bet-against position with a reduced number of shares.

Referring back to decision block 604, the new order is a bet-against (STO) order (Against path). Decision block 608 determines if the contestant has an existing position. If the contestant has no existing position, the STO order remains a STO order and is processed accordingly at step 614. If at decision block 608, the contestant does have an existing position, decision block 616 determines if the existing position is a bet-for or bet-against position. If the existing position is a bet-against position, the new STO order continues processing unchanged as the received STO order at step 614. If the existing position is a bet-for position, decision block 624 determines if the share quantity indicated in the new received STO order is greater than the quantity of shares in the existing bet-for position. If the share quantity of the new STO order is greater than the quantity of shares in the existing bet-for positions, a number of the shares in the share quantity indicated in the new STO order equal to the quantity of shares in the existing bet-for position is made the share quantity in a new STC order at step 626. If the share quantity in the new STO order is not greater than the quantity of shares in the bet-for existing positions, the new STO order is processed unchanged as the new STO order at step 628. As an example, to illustrate operation of step 626, if a contestant has 10 shares in a bet-for position and enters a STO order for 20 bet-against positions, a new STC order is generated with a share quantity of 10 and the share quantity of the received STO order is changed to 10.

Figure 7:
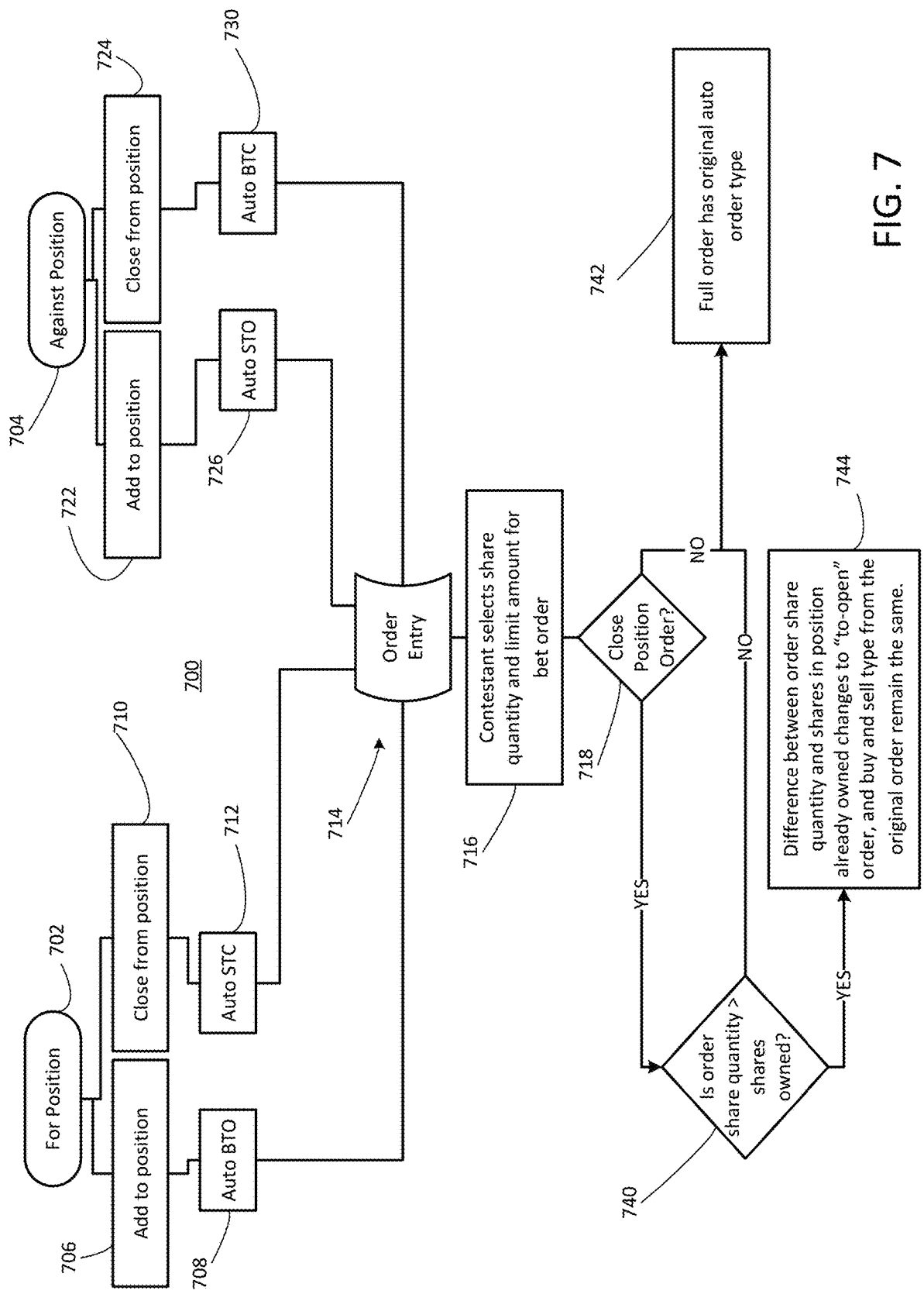
FIG. 7 is a flowchart illustrating processing of adding to and closing existing positions.

FIG. 7 is a flowchart illustrating processing of adding to and closing existing positions. Bet positions are a contestant's interest in a standardized bet contract. The contestant places BTO or STO orders and when unfilled orders meet, the bet orders forming the resulting instance of the standardized bet contract become bet positions. Bet positions may be held, added to, or closed giving the contestant the opportunity to change his bet as the likelihood of the bet event occurring changes. The flowchart 700 in FIG. 7 illustrates how an order type is determined when a contestant wishes to either add to a bet position or close a bet position in an example implementation. It is assumed that the user interface includes a bet-for and a bet-against selector, which open orders for positions (i.e. BTO orders and STO orders).

When a contestant owns an existing bet-for position at step 702 in FIG. 7, the contestant may either add to the position at step 706 or close the position at step 710. When the contestant chooses to add to the bet-for position, the system automatically processes a BTO order at step 708. When the contestant chooses to close the bet-for position, the system automatically processes a STC order at step 712.

When a contestant owns an existing bet-against position at step 704 in FIG. 7, the contestant may either add to the position at step 722 or close the position at step 724. When the contestant requests to add to the bet-against position, the system automatically process a STO order at step 726. When the contestant chooses to close the bet-against position, the system automatically processes a BTC order at step 730.

The contestant adds to a position, or closes a position, in an example implementation by opening an order screen at step 714. At step 716, the order entry screen provides data entry fields in the user interface presented to the contestant to enter a share quantity in a position and a limit amount. At decision block 718, the order is analyzed to determine if it is a close order. The contestant may enter the order as a close order. Close orders may also be generated from different match combinations as shown above with reference to FIGS. 5A and 5B. If the order is not a close order, the entered order is processed with its original type at step 742. For example, a BTO order is processed as an order for a bet-for position. If the order is a close order at decision block 718, decision block 740 determines if the quantity entered in the order entry screen is greater than the number of shares owned in the position. If the quantity is not greater than the number of shares in the position owned, the order is processed as a close order at step 742. If the share quantity of the entered order is greater than the number of positions owned, the difference between the share quantity entered and the number of shares in the position owned is converted to a BTO or STO ("-to-open" order) at step 744. The buy and sell from the original order type remain unchanged.

Figure 8:
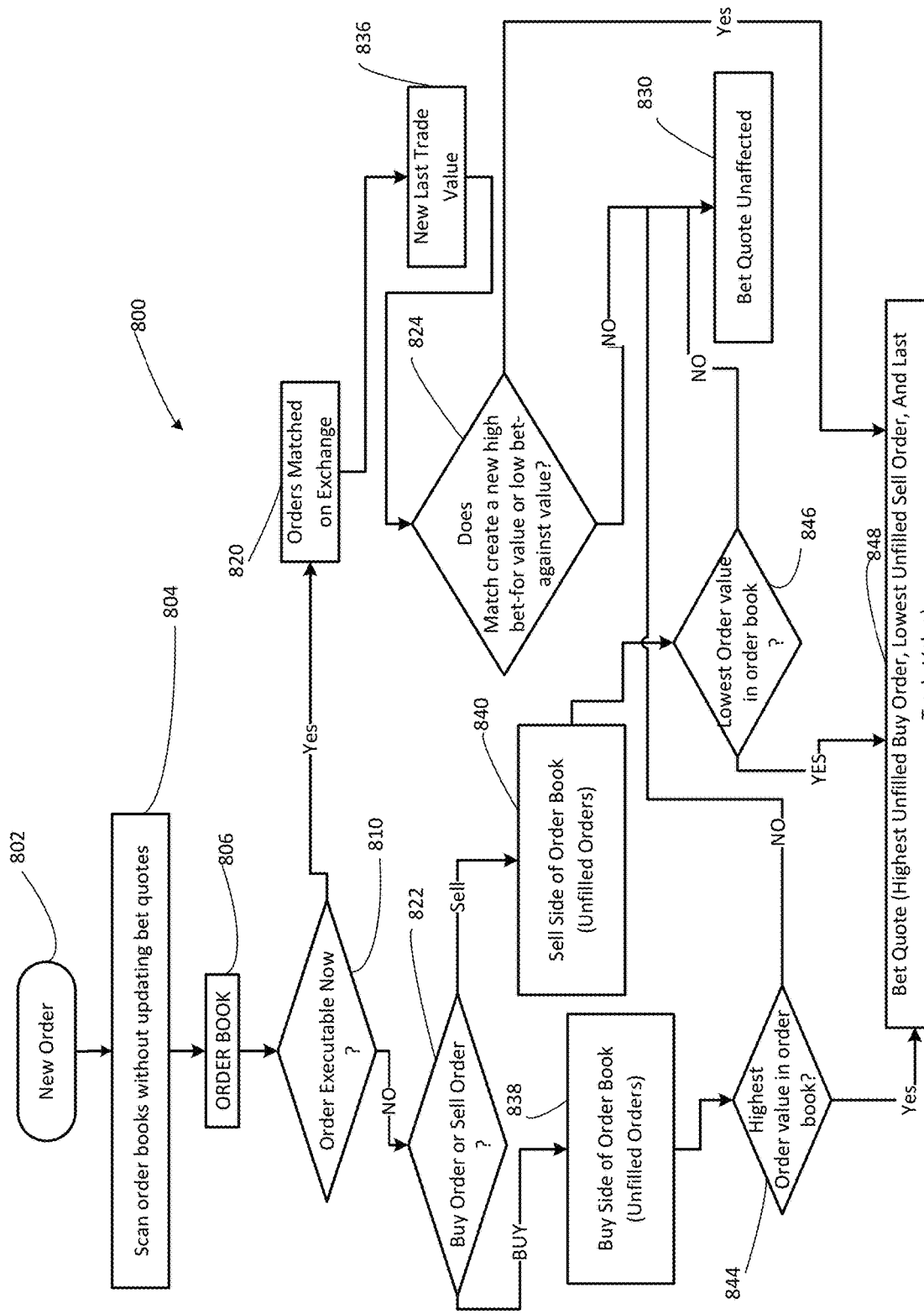
FIG. 8 is a flowchart illustrating processing of bet quotes and order books when new orders are entered.

FIG. 8 is a flowchart illustrating an example method 800 of processing of bet quotes and order books when new orders are entered. In an example implementation, new orders may affect or not affect a bet quote. Each instance of a standardized bet contract may include a bet quote maintained and updated as trades are made. The bet quote includes the highest unfilled buy order, the lowest unfilled sell order, and the most recent trade value per share. The last trade value is updated as the trade amount of the last contract executed. The high buy order value is updated when an order is entered at a value that is higher than the current highest buy trade value. The lowest unfilled bet-against order is updated when a sell order is entered at a value that is lower than the current lowest unfilled sell order.

In an example implementation, unfilled orders are stored in the order book 410 (FIG. 4) as described above with reference to FIG. 4. As shown in FIG. 8 at step 802, a new order is received or processed. The order may be a BTO order or a STO order in a system allowing only a bet-for or bet-against selection. At step 804, the order books 806 are scanned to determine if the new order is immediately executable as described above with reference to FIGS. 4-6.

Decision block 810 determines whether a match was found that would allow for an unfilled bet order in the order book to execute with the new bet order. If such a match is found, the bet order match is carried out on the bet exchange at step 820. At step 836, the last trade value per share of the standardized bet contract is updated to the trade value of the match carried out at step 820. At decision block 824, the match is checked to determine if a new high bet-for value or a low bet-against value is created. If NO, the bet quote is unaffected at step 830. If YES, step 848 updates the bet quote as described below.

If at decision block 810, the new bet order is not immediately executable, the order is analyzed to determine if the order is a bet-for order or a bet-against order at decision block 822. If it is a bet-against order (SELL path) the unfilled bet-against order is stored in the sell side of the order book at 840. The limit value is checked to determine if the bet-against order becomes the lowest unfilled order at decision block 846. If the limit amount of the bet-against order indicates that the bet-against order is the lowest unfilled bet-against order, the bet quote is updated at step 848. Otherwise (NO path from decision block 846), the bet quote is unaffected at step 830, If at decision block 822, the new order is a bet-for order (BUY path), the bet-for order is added to the buy side of the order book at 838. The limit amount of the new order is analyzed at decision block 844 to determine if the limit value would result in a new highest unfilled bet-for order. If the limit amount does not make it the highest value bet-for order in the order book, the bet quote is unaffected at step 830. If at decision block 844, the limit amount of the bet order makes it the highest valued unfilled bet-for order in the order book, the bet quote is updated at step 848.

Figure 9:
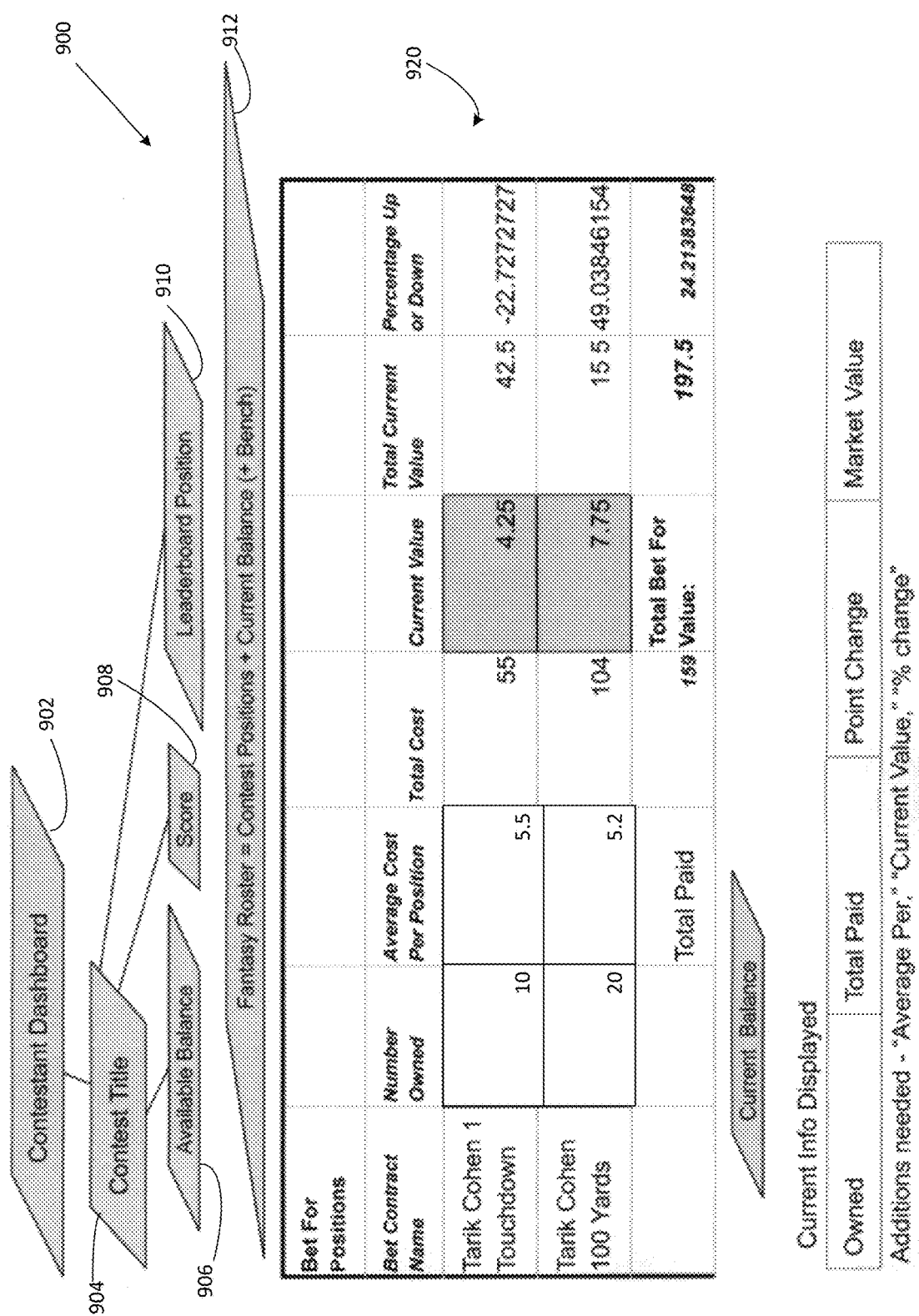
FIG. 9 is a schematic diagram illustrating a current positions portfolio for a contestant having positions in standardized bet contracts in a contest.

FIG. 9 is a schematic diagram illustrating a current positions portfolio 900 for a contestant having positions in standardized bet contracts in a contest. The contestant's current positions portfolio 900 may be displayed in a contestant's dashboard 902 for a given contest. The dashboard 902 may include a contest title 904, an available balance 906, a contestant's score 908, and a leaderboard position 910.

In an example implementation, the contestant's dashboard may be viewed as depicting the contestant's fantasy roster 912 for a contest. The fantasy roster 912 may be summarized as including the contestant's current position values plus the contestant's current balance plus a "bench," which includes unfilled orders made by the contestant.

The dashboard 902 includes a contestant's current positions list 920 shown in FIG. 9 in tabular form. The current positions list 920 stored in the system database may include a full set of data regarding the contestant's holdings, much of which may not be displayed. For example, the current positions list in FIG. 9 includes a section for bet-for positions, which may be separate from another section for bet-against positions. The bet-for positions portion includes a bet contract name, a number of positions owned, an average cost per position, a total cost, a current value, a total current value, a percentage up or down, a total paid, a total bet value, and a total percentage up or down. The current positions list in the dashboard displayed to the contestant may include all information available or only a portion of the information. An example of a dashboard that may be displayed to the contestant is described below with reference to FIG. 13.

Figure 10:
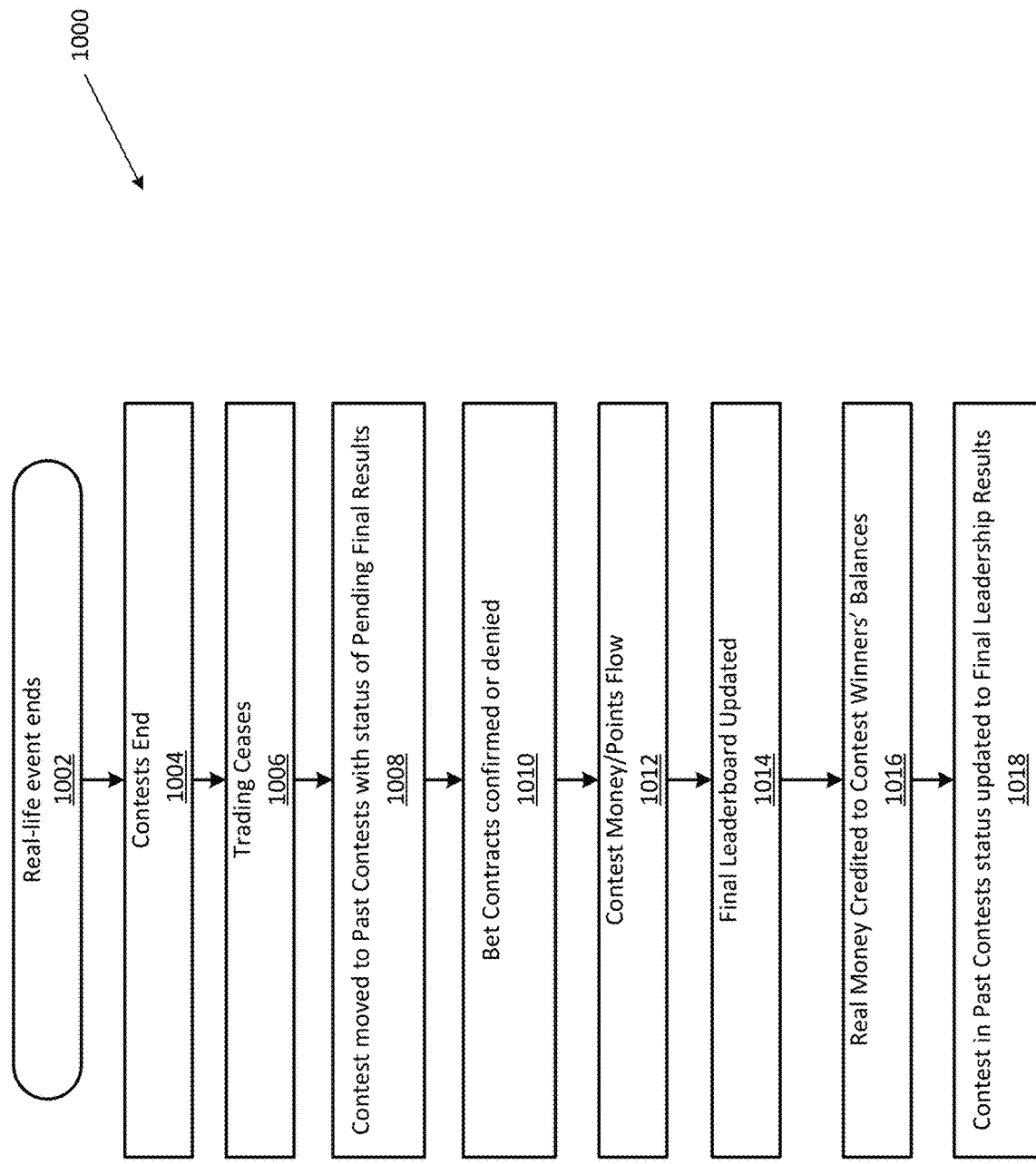
FIG. 10 is a flowchart illustrating an example process for settling a contest.

FIG. 10 is a flowchart illustrating an example process for settling a contest 1000. In an example implementation, standardized bet contracts may be opened, modified, or otherwise remain playable even after the real-life event on which the contest is based has begun. In some standardized bet contracts, the betting may conclude before the real-life event ends, such as when the bet is on a player accomplishing a measure that is met with finality before the event ends. For example, in a standardized bet contract in which the bet event is on whether a player scores three touchdowns, the player may accomplish the bet event before the first half. If such a scenario occurs, trading on that standardized bet contract may be suspended, or merely stop due to a lack of player activity. When the real-life event is completed, no further betting or bet modifications can occur and the process of settlement begins.

Referring to FIG. 10, the real-life game ends at 1002. The contests on the bet exchange system end at substantially the same time as the real-life event at 1004. At step 1006, trading on the standardized bet contracts is stopped. Bet orders received on the standardized bet contracts in the contest are either rejected or ignored or disabled. The contest may then appear in a "Past Contests" section of a user interface display at step 1008. A message "Pending Final Results." may be displayed to the contestants as well. As noted above, certain bet events may be finalized before the real-life event ends. Confirmation of the occurrence of a measure are confirmed or denied at step 1010. At step 1012, contest money/points are paid out. Amounts based on standardized payout amounts and on share quantities are paid to the contestant having bet-for positions if the bet event occurred. The payout amounts are paid to the contestants having a bet-against position if the bet event did not occur. The leaderboard is finalized at step 1014, which may be used to implement the payout structure for the contest. At step 1016, real money may be paid to contest winners based on the payout structure. The contestants may have a real money account tied to a credit card or bank account, which may be used to enter contests and receive award money, for example. At step 1018, the contest may then appear in the past contests section with the final leaderboard results.

Figure 11:
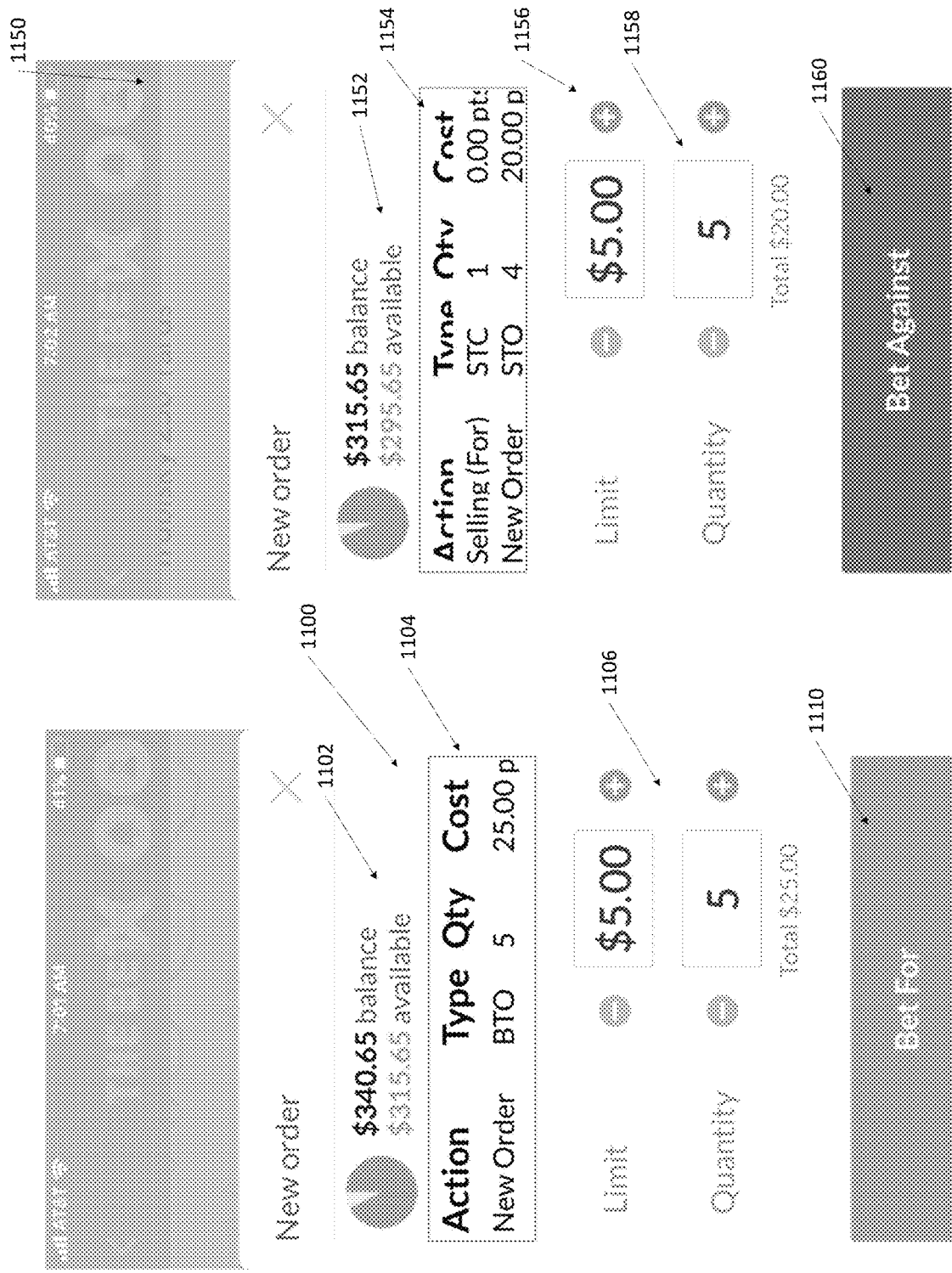
FIGS. 11-15 are examples of user interface screens that may be used on client devices to use the bet exchange system.

FIG. 11 depicts examples of order entry screens that may be displayed on a contestant's client device for use in entering orders in the bet exchange system. The screens include a "Bet For" screen for entering BTO orders using a "Bet-for" selector. The bet-for screen 1100 includes a balance section 1102 indicating a current balance, which includes the amount available to the contestant to place bet orders and enter standardized bet contracts. The balance section 1102 also shows an available balance, which includes entry fees paid and bet positions held by the contestant but may not include amounts paid for unfilled orders.

The bet for screen 1100 includes an action summary section 1104, which includes an action, or a description of the action being attempted by the contestant, a type of action (BTO, BTC orders), a share quantity, and a total cost. The bet for screen 1100 also includes a limit field 1106 for entering a limit amount representing the maximum amount the contestant is willing to pay to make the bet-for order. A quantity field 1108 provides a data entry field for entry of a number of shares desired in the bet-for position. The quantity number is multiplied by the limit amount to determine the total amount the contestant is willing to pay.

Once the contestant enters the desired information to open an order, the contestant presses a bet-for button, or selector 1110 to enter the order into the system.

FIG. 11 depicts the bet-against screen 1150, which includes similar information as the bet-for screen 1100, such as a balance section 1152, an action summary section 1154, a limit field 1156, and a quantity field 1158. The contestant may enter a bet-against order once the information desired is entered into the screen by pressing a bet-against button 1160.

It is noted that an order entry screen in example implementations may include more or less information. The information is provided to assist the contestant in deciding how much or whether to open an order. An order entry screen may also be provided to close orders. For example, the buttons would provide BTO, BTC, STO, and STC options.

Figure 12:
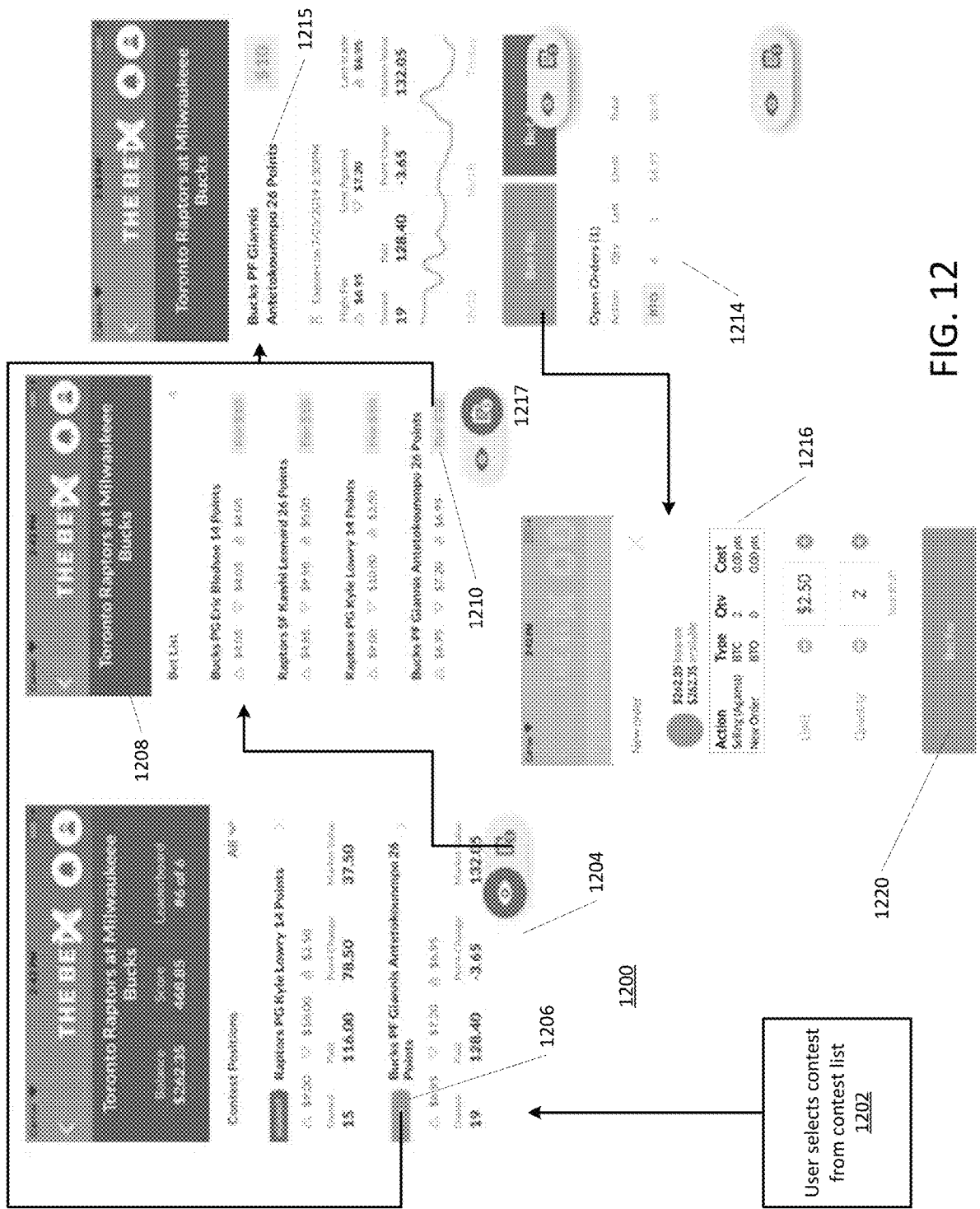

FIG. 12 is a user interface flow diagram illustrating an example of the flow of the use of the bet exchange to view a contestant's current positions, view available bet contracts, and enter a bet order to open or close a position with respect to a contest 1200 in which the contestant has entered. The flow begins at step 1202 when the contestant selects a contest. The user interface display on the client device may display a contestant dashboard current positions list 1204 or a dashboard bet list 1208. The contestant may press a switch dashboard view selector to display the dashboard bet list 1208. The contestant may press a switch selector on the dashboard bet list 1208 to go back to the dashboard current positions list 1204. The contestant may select a standardized bet contract in either the current positions list 1204 or the bet list 1208 to display a bet page 1214. The bet page 1214 includes the bet event identifier 1215, the bet quote 1217, a bet-for selector and a bet-against selector, and a section listing any unfilled orders that the contestant may hold on the standardized bet contract. The bet page 1214 may provide information relating to a contestant's risk in placing a bet order. When the contestant decides to act, the contestant may select either the bet-for selector or the bet-against selector. The example shown in FIG. 12 depicts a selection of the bet-for selector. The client device displays an order entry screen 1216 for a bet-for order, which is similar to the example order entry screen 1100 in FIG. 11.

Figure 13:
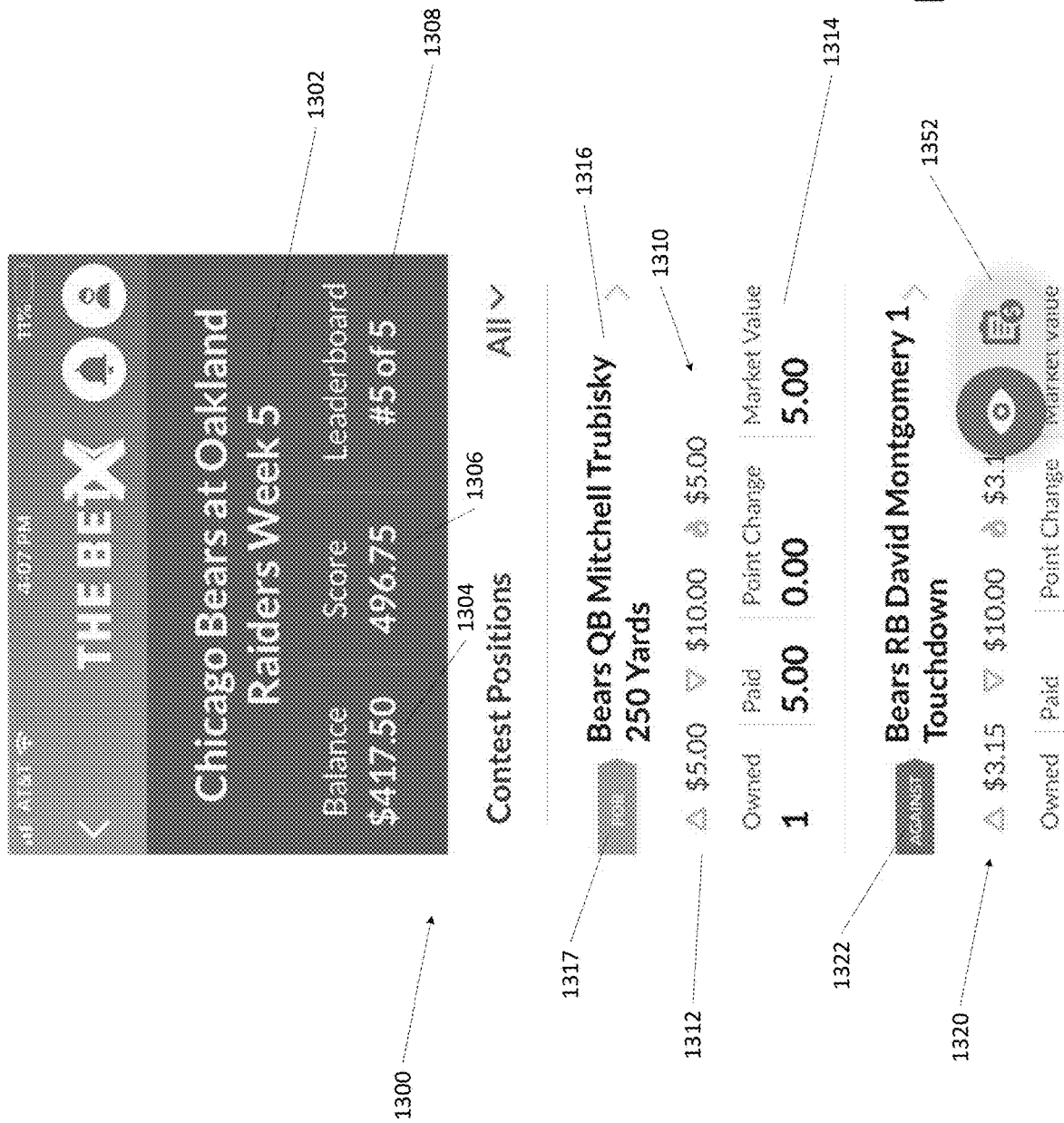

A more detailed example of a contestant dashboard display screen in the current positions list view is shown in FIG. 13. The dashboard 1300 in FIG. 13 may include a contest description 1302, which may be the identification of the real-life event on which the contest is based. The dashboard 1300 may also include the contestant's balance 1304, a contestant score 1306, and a leaderboard position 1308. A list of current positions list having a first current position 1310 and a second current position 1320 displayed as examples. The first current position 1310 includes a description of the bet event 1316, which includes a type indicator 1317. In this current position 1310, the type indicator 1317 indicates that the contestant has a bet-for position on the first current position 1310. The current position 1310 also includes a bet quote 1312 for the standardized bet contract. The first current position includes an interest summary 1314 indicating the extent of the contestant's interest in the bet event. For example, the interest summary 1314 in FIG. 13 indicates that the contestant owns one position for which the contestant paid $5 or 5 points per position. The standardized bet contract is constantly traded by other contestants and its trade value will change. The interest summary 1314 may be with the points change shown in the interest summary 1314. The market value is also shown and is calculated as the number of positions (1) multiplied by the last trade value in the bet quote 1312 ($5) for a total market value of $5. Other information relevant to the contestant's position may be added in the interest summary 1314. Contestants may use the information in the interest summary 1314 to monitor how the contestant's bet positions are performing. The interest summary 1314 combined with the bet quote 1314 and other types of information that may be derived from the bet quote and interest summary 1314 are powerful tools that may be provided to the contestant to assist the contestant in deciding how to maximize winnings and reduce risk. The contestant may monitor fluctuations in the value of the contestant's positions quickly, almost in real-time, and implement responses to the changes quickly.

The second current position 1320 is a bet-against position as indicated by a type indicator 1322. The second current position 1320 includes the information contained in the first current position 1310, such as a bet quote 1322, and an interest summary.

The dashboard 1300 in FIG. 13 may include a pair of display change buttons, such as a current position display button 1350 and a bet list display button 1352. The contestant may press the bet list display button 1352 to display a bet list of standardized bet contracts available to play in the contest. An example bet list is described below with reference to FIG. 14. When the bet list is displayed, the same buttons are available. The contestant may press the current positions display button 1350 to display the current positions list as shown in FIG. 13.

Figure 14:
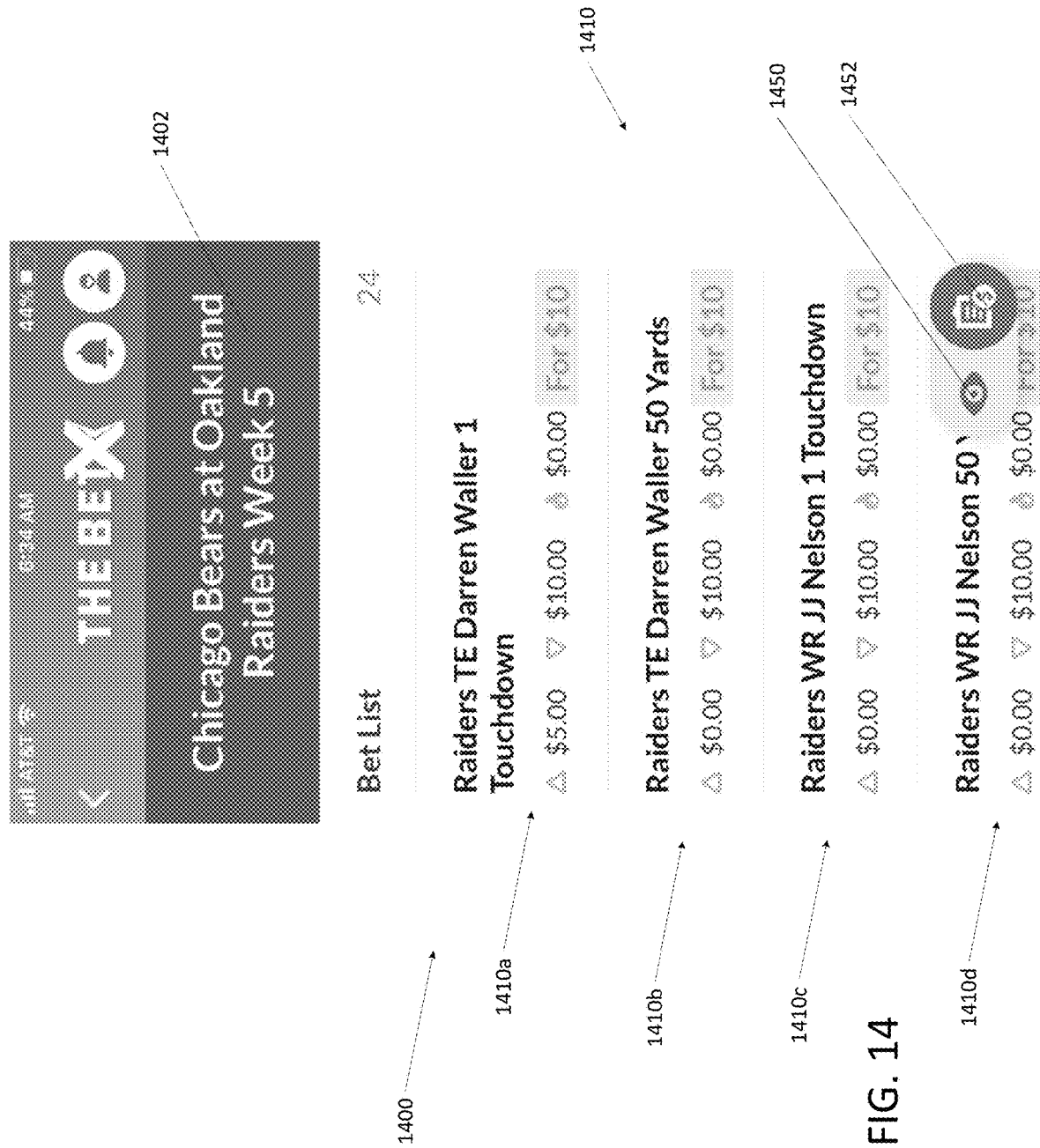

FIG. 14 is a more detailed view of a bet list 1400, which is an example of the bet list 1204 shown in FIG. 12. The bet list 1400 in FIG. 14 includes a contest title 1402, which is the same as the contest title on the contestant's dashboard 1200 (in FIG. 12). The bet list also includes a standardized bet contract list 1410 comprising standardized bet contracts available to the contestant for making bet orders. The standardized bet contract list 1410 includes four standardized bet contracts 1410*a*, 1410*b*, 1410*c*, and 1410*d*. Each standardized bet contract includes a description of the bet event (e.g. subject, event/statistical milestone), a current bet quote, and a standardized payout amount. The bet list 1400 also includes the display switch buttons 1450 and 1452.

Figure 15:
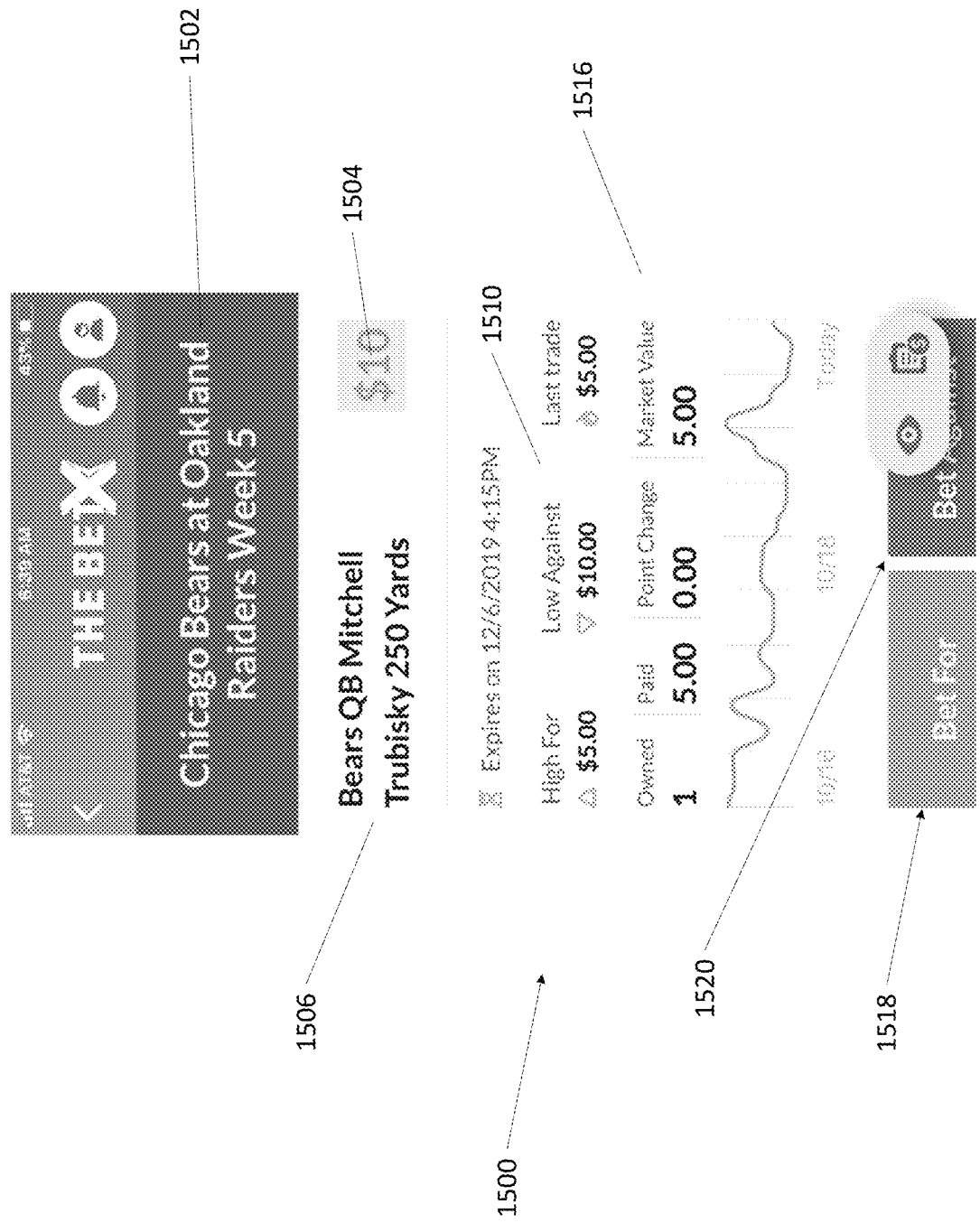

FIG. 15 is a bet page 1500, which is a more detailed example of the bet page 1206 in FIG. 12. The example bet page 1500 in FIG. 15 includes a contest title 1502, a standardized payout amount 1504, a bet event description 1506, a bet quote 1510, a research summary section 1516, a bet for button 1518 to select to enter a BTO position, a bet against button 1520 to select to enter a STO order. The bet page 1500 may also include an open orders section to list unfilled orders that the contestant may have pending for the standardized bet contract.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

What is claimed is:

1. A bet exchange system comprising:
    a data network connection to communicate over a data network with a plurality of client devices associated with a plurality of contestants entered in a pre-configured contest based on a real-life event, the pre-configured contest comprising at least one bet event associated with the real-life event, the client devices having a display, a user interface, and a bet exchange client application comprising machine instructions configured to:
        display the user interface to enable the user to select a bet position and to enter a limit amount for a bet position, the limit amount indicative of a contestant's maximum amount to pay for the bet position; and
        to generate a bet order where the bet order includes digital data corresponding to a buy order for a bet-for position on one of the bet events in the pre-configured contest occurring or a sell order for a bet-against position on the bet event in the pre-configured contest not occurring, each bet order having the limit amount entered by the contestant;
    a system database configured to store bet records and executable programs configured to receive and send communications over the data network, and to perform program functions of the bet exchange system;
    a plurality of bet orders received at a server, the plurality of bet orders generated by the bet exchange client application on the plurality of client devices and communicated by the client devices electronically over the data network;
    a bet exchange core module comprising machine instructions executed by a processor operating in the server, the bet exchange core module configured to:
    process the plurality of bet orders as the bet orders are received by comparing bet orders that are buy orders with bet orders that are sell orders based on the limit amount corresponding to each bet order to identify matched bet orders;
    generate instances of two-party standardized bet contracts from matched bet orders, each standardized bet contract having a bet-for position and a bet-against position on the bet event corresponding to buy orders matched with sell orders, each standardized bet contract comprising a bet event identifier and a standardized payout amount,
    where the bet exchange core module compares the limit amount of the bet orders to determine a trade amount for a match that does not exceed the limit amounts of the bet orders,
    where the trade amount is a last trade value for each standardized bet contract as the standardized bet contracts are generated; and
    store bet orders that are unmatched based on the limit amount as unfilled bet orders to wait for bet orders having limit amounts to match with the unfilled bet orders;
    a user interface module comprising program functions executed by the processor on the server configured to communicate over the data network the last trade value and the bet position corresponding to the standardized bet contract to the client devices, where the bet exchange client application executing on the client devices is configured to display the bet position corresponding to the standardized bet contract and a selector to enable display of an order entry interface for the contestant to modify the bet position and the last trade value as the last trade value for the bet position changes as standardized bet contracts are generated in real time; and
    a fulfillment module comprising program functions executed by the processor on the server configured to manage a transfer of an amount based on a final trade value of the instances of standardized bet contract and the standardized payout amount to the contestants holding bet-for positions when the bet event has occurred or to the contestants holding bet-against positions when the bet event has not occurred.

2. The bet exchange system of claim 1 further comprising:
    a sequencing module comprising program functions executed by the processor on the server, the sequencing module configured to receive unfilled bet orders as unfilled buy orders and unfilled sell orders, and to store the unfilled bet-for orders in a buy-side of an order book stored in the database in a buy sequence starting from a highest valued unfilled bet-for order to a lowest valued unfilled bet-for order, the sequencing module further configured to store unfilled bet-against orders in a sell-side of the order book in a sell sequence starting from a lowest valued unfilled bet-against order to a highest valued bet-against order.

3. The bet exchange system of claim 2 where the bet exchange core module matches buy orders and sell orders by:
    comparing the limit amount of the buy orders with the limit amount of the unfulfilled sell orders as the buy orders are received, and the limit amount of the sell orders with the unfilled buy orders as the sell orders are received;
    setting the trade amount of a match between each buy order and sell order to the limit amount of the bet order received earlier in time.

4. The bet exchange system of claim 3 where in comparing the limit amounts of the bet orders, one of either the buy order or the sell order is a received bet order and the other one of the buy order or the sell order is retrieved from the order book, the bet exchange core module matches buy orders and sell orders by:
  setting the trade amount of the match between the buy order and sell order to the limit amount of the bet order retrieved from the order book.

5. The bet exchange system of claim 4 where in comparing the limit amounts of the bet orders:
  determining, during the comparing of the received bet order and the bet order in the order book whether a match based on the limit amount of the bet order from the order book is immediately executable; and
  moving the received bet order to the order book if the match is not immediately executable.

6. The bet exchange system of claim 4 where:
  a plurality of the bet orders received from the client devices includes buy orders comprising buy-to-open (BTO) orders and buy-to-close (BTC) orders, and sell orders comprising sell-to-open (STO) orders and sell-to-close (STC) orders, and the bet exchange core module compares bet orders in combinations consisting of: BTO orders with STO orders, BTO orders with STC orders, BTC orders with STO orders, and BTC orders with STC orders,
  the bet exchange core module is configured to:
    match bet orders to generate a bet-for position and a bet-against position when a BTO order meets a STO order at a trade amount that is equal to or less than the limit amounts of the BTO order and the STO order, where the bet-for-position corresponds to the BTO order, and the bet-against position corresponds to the STO order; and
  the bet exchange system further comprising:
    a position modifier module comprising program functions executed by the processor on the server, the position modifier module configured to:
      match bet orders to transfer an existing bet-for position when a BTO order meets an STC order at a trade amount that is equal to or less than the limit amounts of the BTO order and the STC order,
      match bet orders to transfer an existing bet-against position when a BTC order meets an STO order at a trade amount that is equal to or less than the limit amounts of the BTC order and the STO order,
      match bet orders to close an existing bet-against position and an existing bet-for position to close two instances of the standardized bet contract and generate a new instance of the standardized bet contract when a BTC order meets an STC order at a trade amount that is equal to or less than the limit amounts of the BTC order and the STC order.

7. The bet exchange system of claim 6 where each bet order includes a shares quantity indicative of, for bet-for orders, a number of bet-for shares in the bet-for position for which the bet-for order is placed, place or, for bet-against orders, a number of bet-against shares requested in the bet-against position for which the bet-against order is placed.

8. The bet exchange system of claim 7 further comprising a current positions list corresponding to each contestant where, when generating the instance of the standardized bet contract, the bet position generated in the standardized bet contract is transferred to the current positions list of the contestant that sent the bet order, where each bet position comprises a quantity of shares, an average amount paid for each share, and an order type identifier.

9. The bet exchange system of claim 8 where, each bet order received is sent by an order maker as either a bet-for order or a bet-against order, and the bet exchange core module:
  determines, when the received bet order is a received bet-for order, whether the current position list for the order maker of the received bet-for order includes existing positions in the standardized bet contract;
  processes the received bet-for order as a received BTO order when the current position list of the bet-for order maker does not include any existing positions in the standardized bet contract;
  determines whether the existing positions of the bet-for order maker in the bet event are bet-for positions or bet-against positions;
  processes the received bet-for order as a BTO order when the existing positions of the contestant in the standardized bet contract are bet-for positions;
  determines when the existing positions of the bet-for order maker are bet-against positions, whether the share quantity of the received bet-for order is greater than the quantity of existing bet-against positions;
  processes the received bet-for order as a received BTC order with a share quantity equal to the share quantity of the existing bet-against positions and moving the received bet-for order to the order book as a BTO order with a share quantity equal to a remainder of the share quantity of the received bet-for order when the share quantity of the received bet-for order is greater than the share quantity of existing bet-against positions; and
  processes the received bet-for order as a received STC order for a share quantity equal to the share quantity of the received bet-for order and leaving the existing bet-against positions as bet-against positions with a share quantity equal to a remainder of the share quantity of existing bet-against positions when the share quantity of the received bet-for order is less than or equal to the share quantity of existing bet-against positions.

10. The bet exchange system of claim 9 in receiving each bet order, the bet exchange core module:
  determines, when the received bet order is a received bet-against order, whether the current position list for the bet-against order maker includes existing positions in the bet event;
  processes the received bet-against order as a received STO order when the current position list of the bet-against order maker does not include any existing positions in the bet event;
  determine whether the existing positions of the bet-against order maker in the bet event are bet-for positions or bet-against positions;
  processes the received bet-against order as a received STO order when the existing positions of the bet-against order maker in the bet event are bet-against positions;
  determine when the existing positions of the bet-against order maker are bet-for positions, whether the share quantity of the received bet-against order is greater than the share quantity of the existing bet-for positions;
  processes the received bet-against order as a STC order with a share-quantity equal to the share quantity of the existing bet-for positions and moving the received bet-against order as a STO order to the order book with a share quantity equal to a remainder of the share quantity of the received bet-against order when the share quantity of the received bet-against order is greater than the share quantity of existing buy-for positions; and processes the received bet-against order as a BTC order with a share quantity equal to the share quantity of the received bet-against order and leaving the existing bet-for positions as bet-for positions with a share quantity equal to a remainder of the quantity of existing bet-for positions when the share quantity of the received bet-against order is less than the share quantity of existing bet-for positions.

11. The bet exchange system of claim 10 where in receiving the plurality of bet orders, the system further comprises:

an order sequencer configured to sequence the unfilled BTO orders and BTC orders that are not immediately executable in the order book from a highest limit amount to a lowest limit amount, and to sequence the unfilled STO orders and STC orders that are not immediately executable in the order book from a lowest limit amount to a highest limit amount.

12. The bet exchange system of claim 11 where in matching the one of the BTO orders with STO orders, the bet exchange core module further:

sets the last trade value per share of the standardized bet contract to the trade amount per share for the match between the BTO order and the STO order;

generates the instance of the standardized bet contract between the BTO order and the STO order for the bet event;

deduct the value of the trade based on the trade amount per share of the bet event for the share quantity of the trade from the available balance of the contestant that made the BTO order; and deduct the value of the trade based on the standardized payout amount minus the trade amount per share for the share quantity of the trade from the available balance of the contestant that made the STO order.

13. The bet exchange system of claim 11 where in matching one of the BTO orders with one of the STC orders, the bet exchange core module:

sets the last trade value of the standardized bet contract per share of the standardized bet contract to the trade amount per share for the match between the BTO order and the STC order;

deducts the last trade value per share of the standardized bet contract for the share quantity of the match from the available balance of the contestant that made the BTO order; and add the last trade value per share of the standardized bet contract for the share quantity of the match to the available balance of the contestant that made the STC order.

14. The bet exchange system of claim 11 where in matching one of the BTC orders with one of the STO orders, the bet exchange core module:

sets the last trade value per share of the bet event to the trade amount per share for the match between the BTC order and the STO order;

adds the standardized payout amount per share minus the last trade value per share of the bet event for the quantity of shares matched from the available balance of the contestant that made the BTC order; and deducts the standardized payout amount per share minus the last trade value per share for the share quantity of the match from the available balance of the contestant that made the STO order.

15. The bet exchange system of claim 11 where in matching one of the BTC orders with one of the STC orders, the bet exchange core module:

sets the last trade value per share of the bet event to the trade amount per share for the match between the BTC order and the STC order;

adds the standard payout amount per share minus the last trade value per share for the share quantity of the match from the available balance of the contestant that made the BTC order; and adds the last trade value per share for the quantity of shares in the match to the available balance of the contestant that made the STC order.

16. The bet exchange system of claim 11 where the bet exchange core module:

stores unfilled bet-for orders that could not be immediately executed in the order book on a buy-side separate from a sell-side; and stores unfilled bet-against orders in the order book in the against-side.

17. A non-transitory, computer-implemented method on a bet exchange system operating on a server and having a system database, the method comprising:

receiving, at the server for processing by a processor in the server, a plurality of bet orders over a data network from a plurality of client devices associated with a plurality of contestants entered in a pre-configured contest based on a real-life event, where the bet orders include digital data corresponding to a buy order for a bet-for position on one of the bet events in the pre-configured contest occurring or a sell order for a bet-against position on the bet event in the pre-configured contest not occurring, each bet order having a limit amount and a bet position entered by the contestant via a user interface operating on each client device with a bet exchange client application;

comparing, by the processor, the limit amount of the buy orders with the limit amount of the sell orders to determine a trade amount for a match between the buy orders and the sell orders where the trade amount is based on the limit amount of the buy order or the sell order;

generating, by the processor, an instance of a two-party standardized bet contract when the trade amount of a match between one of the buy orders and one of the sell orders is less than or equal to a value based on the limit amounts of the BTO order and the STO order, where the BTO order and the STO order in the standardized bet contracts become a bet-for position and a bet-against position, respectively, for the contestants that sent the bet orders, where each standardized bet contract comprises a bet event identifier and a standardized payout amount, and each instance of a standardized bet contract further includes the bet-for position and the bet-against position on the bet event, where the trade amount is a last trade value for each standardized bet contract as the standardized bet contracts are generated;

storing, in a database, bet orders that are unmatched as unfilled bet orders to compare with bet orders as bet orders are received until the unfilled bet orders match with received bet orders having limit amounts to match with the unfilled bet orders to generate standardized bet contracts;

communicating, over the data network, the last trade value and the bet position corresponding to the standardized bet contract to the client devices for display to contestants entering bet information on the bet exchange client application executing on the client devices, where the bet exchange client application executing on the client devices is configured to display the bet position corresponding to the standardized bet contract and a selector to enable display of an order entry interface for the contestant to modify the bet position and the last trade value as the last trade value for the bet position changes as standardized bet contracts are generated in real time; and settling, by the processor, the instances of standardized bet contracts by transferring in the database an amount based on a final trade value of the instances of standardized bet contract and the standardized payout amount to the contestants holding bet-for positions when the bet event has occurred or to the contestants holding bet-against positions when the bet event has not occurred.

18. The method of claim 17 where:

the step of receiving the plurality of the bet orders received from the client devices includes receiving buy orders including buy-to-open (BTO) orders and sell-to-close (STC) orders, and sell orders including sell-to-open (STO) orders and buy-to-close (BTC) orders, the method further comprising:

comparing, by the processor, bet orders in combinations comprising BTO orders with STO orders, BTO orders with STC orders, BTC orders with STO orders, and BTC orders with STC orders, the method further comprising:

matching bet orders to generate the standardized bet contract including the bet-for-position and the bet-against position when a BTO order meets an STO order at a trade amount that is equal to or less than the limit amounts of the BTO order and the STO order, matching bet orders to transfer an existing bet-for position when a BTO order meets an STC order at a trade amount that is equal to or less than the limit amounts of the BTO order and the STC order, matching bet orders to transfer an existing bet-for position to a new bet-against position when a BTC order meets an STO order at a trade amount that is equal to or less than the limit amounts of the BTC order and the STO order, matching bet orders to close an existing bet-against position and an existing bet-for position to close two instances of the standardized bet contracts and generating a new instance of the standardized bet contract when a BTC order meets an STC order at a trade amount that is equal to or less than the limit amounts of the BTC order and the STC order.

19. The method of claim 17 where the step of comparing the limit amount of the BTO orders with the limit amount of the STO orders comprises: where one of the bet orders is a received bet order and is either a received BTO order or a received STO order, and the other one of the bet orders is an unfilled bet order that is either an unfilled BTO order or an unfilled STO order, setting the trade amount of a match between one of the received bet orders and one of the unfilled bet orders to the limit amount of the unfilled bet order.

20. The method of claim 17 further comprising:

creating, by the processor, a user account in the system database for each contestant associated with the plurality of client devices, each user account comprising at least one dashboard corresponding to each contest in which the contestant is entered, the dashboard comprising the contestant's current positions list, and an available balance for the contestant in the contest.

21. The method of claim 17 comprising, before the step of receiving the plurality of bet orders:

generating, by the processor, the contest in the system database based on the real-life event, the contest having a contest description, a bet list, and a contest entry amount;

generating, by the processor, each standardized bet contract and adding each standardized bet contract to the bet list in the contest.

* * * * *